US012736846B2

(12) United States Patent
Tominaga

(10) Patent No.: US 12,736,846 B2
(45) Date of Patent: Sep. 15, 2026

(54) DISPLAY DEVICE

(71) Applicant: Sharp Display Technology Corporation, Kameyama City (JP)

(72) Inventor: Masakatsu Tominaga, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 19/091,665

(22) Filed: Mar. 26, 2025

(65) Prior Publication Data

US 2025/0334839 A1 Oct. 30, 2025

(30) Foreign Application Priority Data

Apr. 26, 2024 (JP) ................................ 2024-072167

(51) Int. Cl.

| | |
|---|---|
| ***G02F 1/1362*** | (2006.01) |
| ***G02F 1/1333*** | (2006.01) |
| ***G06F 3/041*** | (2006.01) |
| ***G06F 3/044*** | (2006.01) |
| ***G09G 3/36*** | (2006.01) |

(52) U.S. Cl.

CPC .... *G02F 1/136286* (2013.01); *G02F 1/13338* (2013.01); *G06F 3/0412* (2013.01); *G06F 3/04164* (2019.05); *G06F 3/044* (2013.01); *G09G 3/3648* (2013.01); *G09G 2300/0426* (2013.01); *G09G 2320/02* (2013.01); *G09G 2354/00* (2013.01)

(58) Field of Classification Search

CPC ........... G02F 1/136286; G02F 1/13338; G06F 3/04164; G06F 3/0412; G06F 3/044; G09G 3/3648; G09G 2300/0426; G09G 2320/02; G09G 2354/00

See application file for complete search history.

(56) References Cited

U.S. PATENT DOCUMENTS

| | | | | |
|---|---|---|---|---|
| 9,865,218 | B2 * | 1/2018 | Kim | G09G 3/3688 |
| 2018/0151145 | A1 * | 5/2018 | Lee | G09G 5/02 |
| 2020/0020296 | A1 * | 1/2020 | Kim | G09G 3/3648 |
| 2022/0020334 | A1 * | 1/2022 | Kim | G09G 3/3275 |
| 2022/0051638 | A1 * | 2/2022 | Huang | G09G 3/3614 |
| 2023/0022014 | A1 * | 1/2023 | Bang | G06F 3/0446 |

FOREIGN PATENT DOCUMENTS

| | | |
|---|---|---|
| JP | 2016-218330 A | 12/2016 |

* cited by examiner

*Primary Examiner* — Peter D McLoone
(74) *Attorney, Agent, or Firm* — ScienBiziP, P.C.

(57) ABSTRACT

A display device includes a second line, a third line, and a first line between the second and the third line, a connection line connected to the first line, a first switching line, a second switching line, a first switching component, a second switching component, and a signal supply section. The first switching component is connected to the first switching line, the second line, and the first line or the connection line. The second switching component is connected to the second switching line, the third line, and the first line or the connection line. The signal supply section is configured to supply an image signal to the connection line and supply a switching signal having a voltage higher than a threshold voltage of the first and second switching components to the first switching line and the second switching line at different timings.

20 Claims, 17 Drawing Sheets

15
AA
NAA
11S
12
14
SS
16
12
15
20
21
11
21A
13
10
X
Y

FIG.2
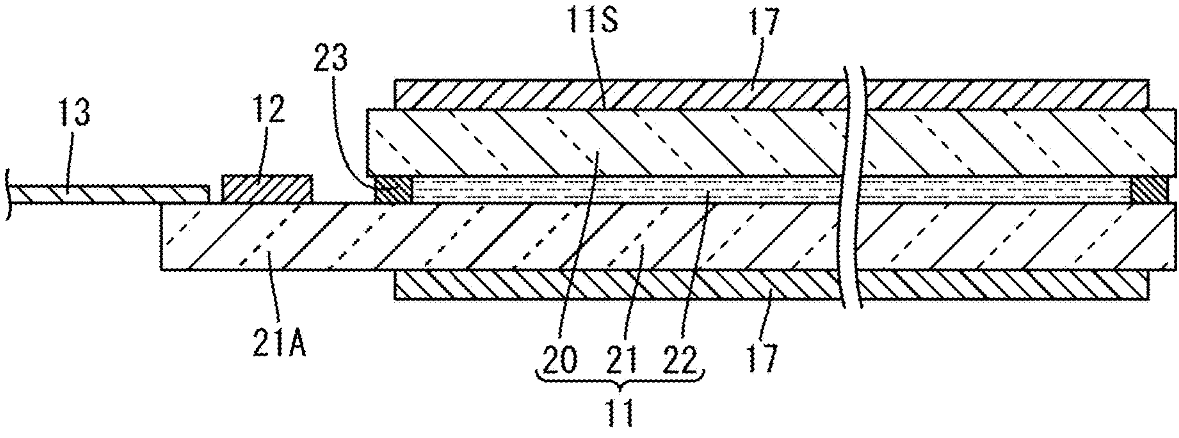
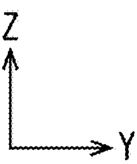

11
22
31
29
30
29
20
32
17
B
G
R
B
27Aγ 27Bγ
27γ
28A
28B
27Aα 27Bα
27α
28
36
25
35
34
33
17
21
27Aβ 27Bβ
27β
X
Z 11
22
31
30
29
20
32
17
B
G
R
28
36
35
34
33
17
21
CHPX
25
24C
24D
24A
24B
24
CHS3
27Aγ (27A)
27γ (27)
27Bγ (27B)
CHS1
27Aα
27α
27Bα
X
Z t1
t2
t3
t4
H
H
G(i)
G(i+1)
SW1
SW2
Vgh
Vgl
Vgh
Vgl
Vgh
Vgl
Vgh
Vgl 111R
115
111S
AA
NAA
111L
21A
112
116
111
20
121
111R
115
AA1
AA2
111L
116
AA1
X
Y 111
116U
140
141
140A
140B
140C
140D
141A
141B
141C
141D
139
138
AA
AA1
AA2
127
127α
127β
127γ
24
24A
24B
24C
24D
25
26
NAA
137
112
X
Y 410
15
16
48
CHTP
49
AA
NAA
411S
21A
412
SS
414
428
20
421
411
413
X
Y

AA
NAA
26
38
39
37
16
16U
40
41
40A
40B
40C
40D
41A
41B
41C
41D
412
411
427
427α
427Aα
427Bα
427β
427γ
49
49α
49β
25
24
24A
24B
24C
24D
X
Y 411
22
31
29
30
20
32
17
R
G
B
48
436
435
434
33
17
21
CHX
25
24C
24D
24A
24B
24
CHTP
49α
427β
CHS1
427Aα
427Bα
427α
Z
X 510
528
15
16
CHCM
51
50A
50B
50
21A
512
SS
514
15
51
CHCM
20
521
511
512
513
X
Y

DISPLAY DEVICE

CROSS REFERENCE TO RELATED APPLICATION

This application claims priority from Japanese Patent Application No. 2024-72167 filed on Apr. 26, 2024. The entire contents of the priority application are incorporated herein by reference.

TECHNICAL FIELD

The present technology described herein relates to a display device with which display quality is improved.

BACKGROUND

A liquid crystal display device has been known as one example of display devices. One example of such a liquid crystal display device includes pixel electrodes that are divided into groups with respect to a predefined direction and image signal lines that are electrically connected to the pixel electrodes. Particular one of the image signal lines is electrically connected to a drive circuit unit. A pixel electrode selection circuit is arranged on a liquid crystal side surface of a first substrate and is on an opposite side from the drive circuit unit via a display area. The pixel electrode selection circuit is disposed to overlap a frame portion in a plan view. The pixel electrode selection circuit unit supplies image signals with a time-division method from the drive circuit unit to each of the pixel electrodes of a group through the particular one of the image signal lines.

In such a liquid crystal display device, the group of pixel electrodes includes three pixel electrodes and the three image signal lines are connected to the respective three pixel electrodes. The three image signal lines are connected to the pixel electrode selection circuit and the particular one of the three image signal lines is connected to the drive circuit unit. The pixel electrode selection circuit supplies image signals, which are supplied from the drive circuit unit via the particular image signal line, with the time-division method to the three image signal lines of one group. However, the particular image signal line is an end side one of the three image signal lines of one group. Therefore, routing of the particular image signal line to be connected to the CMOS transfer gate components included in the pixel electrode selection circuit is likely to be complicated. Specifically, the particular image signal line crosses the time-division signal input lines included in the pixel electrode selection circuit. This causes a parasitic capacitance between the particular image signal line and the time-division signal input lines and accordingly, a load on the particular image signal line may be increased. With a load on the particular image signal line being increased, delay is caused on the image signal transferred through the particular image signal line and this may lower display quality.

SUMMARY

The technology described herein was made in view of the above circumstances. An object is to improve display quality.

(1) A display device according to the technology described herein includes a display panel including a display area in which an image is displayed and a non-display area in which no image is displayed, a first line disposed in the display area, a second line disposed in the display area, a third line disposed in the display area, a connection line disposed in the non-display area and connected to the first line, a first switching line disposed in the non-display area, a first switching component disposed in the non-display area and including a first gate electrode that is connected to the first switching line, a first source electrode that is connected to one of the first line or the connection line, and a first drain electrode that is connected to the second line, a second switching line disposed in the non-display area, a second switching component disposed in the non-display area and including second gate electrode that is connected to the second switching line, a second source electrode that is connected to one of the first line or the connection line, and a second drain electrode that is connected to the third line, and a signal supply section disposed in the non-display area and connected to the connection line, the first switching line, and the second switching line. The signal supply section is configured to supply an image signal to the connection line and supply a switching signal having a voltage higher than a threshold voltage of the first switching component and the second switching component to the first switching line and the second switching line at different timings. The first line is disposed between the second line and the third line.

(2) In the display device, in addition to (1), the first line, the second line, the third line, the connection line, the first switching line, the second switching line, the first switching component, and the second switching component may be disposed on the display panel. The signal supply section may include at least a first signal supply section that is disposed on the display panel and connected to the connection line and configured to supply the image signal to the connection line. The first line, the second line, and the third line may extend along a first direction. The first signal supply section and each of the first switching component and the second switching component may be disposed on the display panel to sandwich the display area with respect to the first direction. The first line may be connected to the first source electrode and the second source electrode.

(3) In the display device, in addition to (2), the first switching component and the second switching component may be disposed between the display area and each of the first switching line and the second switching line.

(4) In the display device, in addition to any one of (2) or (3), the first switching component and the second switching component may be disposed to sandwich the first line with respect to a second direction that crosses the first direction.

(5) In the display device, in addition to (1), the first line, the second line, the third line, the connection line, the first switching line, the second switching line, the first switching component, and the second switching component may be disposed on the display panel. The signal supply section may include at least a first signal supply section that is disposed on the display panel and connected to the connection line and configured to supply the image signal to the connection line. The first line, the second line, and the third line may extend along a first direction. The first switching component may include first switching components and the second switching component may include second switching components. One of the first switching components and one of the second switching components may be defined as a first pair of first and second switching components and another one of the first switching components and another one of the second switching components may be defined as a second pair of first and second switching components. The first pair of first and second switching components and the second pair of first and second switching components may be disposed on the display panel to sandwich the display area with respect to the first direction. The first signal supply section may be disposed on a same side as the first pair of first and second switching components on the display panel. The first switching component and the second switching component included in the first pair of first and second switching components may be defined as a one-side first switching component and a one-side second switching component. The first source electrode of the one-side first switching component may be defined as a one-side first source electrode and the second source electrode of the one-side second switching component may be defined as a one-side second source electrode. The connection line may be connected to the one-side first source electrode and the one-side second source electrode. The second pair of first and second switching components may be disposed on an opposite side from the first signal supply section with respect to the display area in the first direction. The first switching component and the second switching component included in the second pair of first and second switching components may be defined as an other-side first switching component and an other-side second switching component. The first source electrode of the other-side first switching component may be defined as an other-side first source electrode and the second source electrode of the other-side second switching component may be defined as an other-side second source electrode. The first line may be connected to the other-side first source electrode and the other-side second source electrode.

(6) The display device may further include, in addition to (1), a first switching circuit that includes the first switching line, the second switching line, and unit switching circuits each including the first switching component and the second switching component. The first line, the second line, the third line, the connection line, and the first switching circuit may be disposed on the display panel. The signal supply section may include at least a first signal supply section that is disposed on the display panel and connected to the connection line and is configured to supply the image signal to the connection line. The first line, the second line, and the third line may extend along a first direction. The display area may include a first area and a second area and an outer dimension of the first area measured in a second direction that crosses the first direction may change according to positions with respect to the first direction and an outer dimension of the second area measured in the second direction may be constant with respect to the first direction. The first line, the second line, and the third line may be disposed in each of the first area and the second area. The connection line may include a first connection line that is connected to the first line disposed in the first area and a second connection line that is connected to the first line disposed in the second area. The first signal supply section may be disposed on one side of the display area on the display panel in the first direction. The unit switching circuits may include a first unit switching circuit and a second unit switching circuit. The first unit switching circuit may include the first switching component and the second switching component, and the first source electrode and the second source electrode of the first switching component and the second switching component included in the first unit switching circuit may be connected to the first line that is connected to the first connection line. The second unit switching circuit may include the first switching component and the second switching component, and the first source electrode and the second source electrode of the first switching component and the second switching component included in the second unit switching circuit may be connected to the second connection line. The first unit switching circuit may be disposed on an opposite side from the first signal supply section with respect to the first direction on the display panel. The second unit switching circuit may be disposed on a same side as the first signal supply section with respect to the first direction on the display panel.

(7) The display device may further include, in addition to (1), a fourth line, a fifth line, a sixth line, a distribution line disposed in the non-display area and connected to the signal supply section, a third switching line disposed in the non-display area, a third switching component disposed in the non-display area and including a third gate electrode connected to the first switching line, a third source electrode connected to the distribution line, and a third drain electrode connected to the fourth line, a fourth switching component disposed in the non-display area and including a fourth gate electrode connected to the second switching line, a fourth source electrode connected to the distribution line, and a fourth drain electrode connected to the fifth line, and a fifth switching component disposed in the non-display area and including a fifth gate electrode connected to the third switching line, a fifth source electrode connected to the distribution line, and a fifth drain electrode connected to the sixth line. The first line, the second line, and the third line may extend along a first direction. The display area may include a first area and a second area and an outer dimension of the first area measured in a second direction that crosses the first direction may change according to positions with respect to the first direction and an outer dimension of the second area measured in the second direction may be constant with respect to the first direction. The first line, the second line, and the third line may be disposed in the first area. The fourth line, the fifth line, and the sixth line may be disposed in the second area.

(8) In the display device, in addition to (7), the first line, the second line, the third line may be longer than the fourth lien, the fifth line, and the sixth line.

(9) In the display device, in addition to any one of (1) to (8), the first line may include a first line portion that is a portion of a first conductive film and a second line portion that is a portion of a second conductive film. The second conductive film may be disposed in a layer upper than the first conductive film via a first insulating film. The first line portion and the second line portion may overlap and may be connected via a first contact hole formed in the first insulating film.

(10) In the display device, in addition to (9), the second line may include a third line portion and a fourth line portion. The third line portion may be a portion of the first conductive film that is different from the portion of the first conductive film configured as the first line portion. The fourth line portion may be a portion of the second conductive film that is different from the portion of the second conductive film configured as the second line portion. The third line may include a fifth line portion and a sixth line portion. The fifth line portion may be a portion of the first conductive film that is different from the portions of the first conductive film configured as the first line portion and the third line portion. The sixth line portion may be a portion of the second conductive film that is different from the portions of the second conductive film configured as the second line portion and the fourth line portion. The third line portion and the fourth line portion may overlap and may be connected via a second contact hole formed in the first insulating film. The fifth line portion and the sixth line portion may overlap and may be connected via a third contact hole formed in the first insulating film.

(11) The display device, may further include, in addition to (9), a first position detection line disposed in the display area and connected to the signal supply section, a second position detection line disposed in the display area and connected to the signal supply section, and position detection electrodes that are disposed in the display area and create a capacitance with a position input body performing position inputting. Each of the position detection electrodes may be connected to at least one of the first position detection line and the second position detection line. The signal supply section may be configured to supply a position detection signal to the first position detection line and the second position detection line. The second line may be a portion of the first conductive film that is different from the portion of the first conductive film configured as the first line portion. The third line may be a portion of the first conductive film that is different from the portions of the first conductive film configured as the first line portion and the second line. The first position detection line may be a portion of the second conductive film that is different from the portion of the second conductive film configured as the second line portion and the first position detection line is disposed to overlap the second line. The second position detection line may be a portion of the second conductive film that is different from the portions of the second conductive film configured as the second line portion and the first position detection line, and the second position detection line may be disposed to overlap the third line.

(12) The display device, may further include, in addition to (9), a common electrode disposed in the display area, a first common line disposed in the display area and connected to the common electrode and the signal supply section, and a second common line disposed in the display area and connected to the common electrode and the signal supply section. The signal supply section may be configured to supply a common potential signal to the first common line and the second common line. The second line may be a portion of the first conductive film that is different from the portion of the first conductive film configured as the first line portion. The third line may be a portion of the first conductive film that is different from the portions of the first conductive film configured as the first line portion and the second line. The first common line may be a portion of the second conductive film that is different from the portion of the second conductive film configured as the second line portion, and the first common line may be disposed to overlap the second line. The second common line may be a portion of the second conductive film that is different from the portions of the second conductive film configured as the second line portion, and the first common line and the second common line may be disposed to overlap the third line.

(13) In the display device, in addition to an one of (1) to (12), the signal supply section may be configured to supply the switching signal to the first switching line with supplying the image signal to the connection line and supply the switching signal to the second switching line with supplying the image signal to the connection line, and thereafter the signal supply section may be configured to supply the image signal to the connection line without supplying the switching signal to the first switching line and the second switching line.

(14) The display device may further include, in addition to one of (1) to (13), a flexible substrate connected to the display panel. The first line, the second line, the third line, the connection line, the first switching line, the second switching line, the first switching component, and the second switching component may be disposed on the display panel.

The signal supply section may include a first signal supply section disposed on the display panel and a second signal supply section connected to the flexible substrate. The first signal supply section may be configured to supply the image signal to the connection line. The second signal supply section may be configured to supply the switching signal to the first switching line and the second switching line at different timings via the flexible substrate.

According to the technology described herein, display quality is improved.

BRIEF DESCRIPTION OF THE DRAWINGS

FIG. 2 is a cross-sectional view illustrating the liquid crystal panel, the driver, and the flexible substrate according to the first embodiment.

DETAILED DESCRIPTION

First Embodiment

Figure 1:
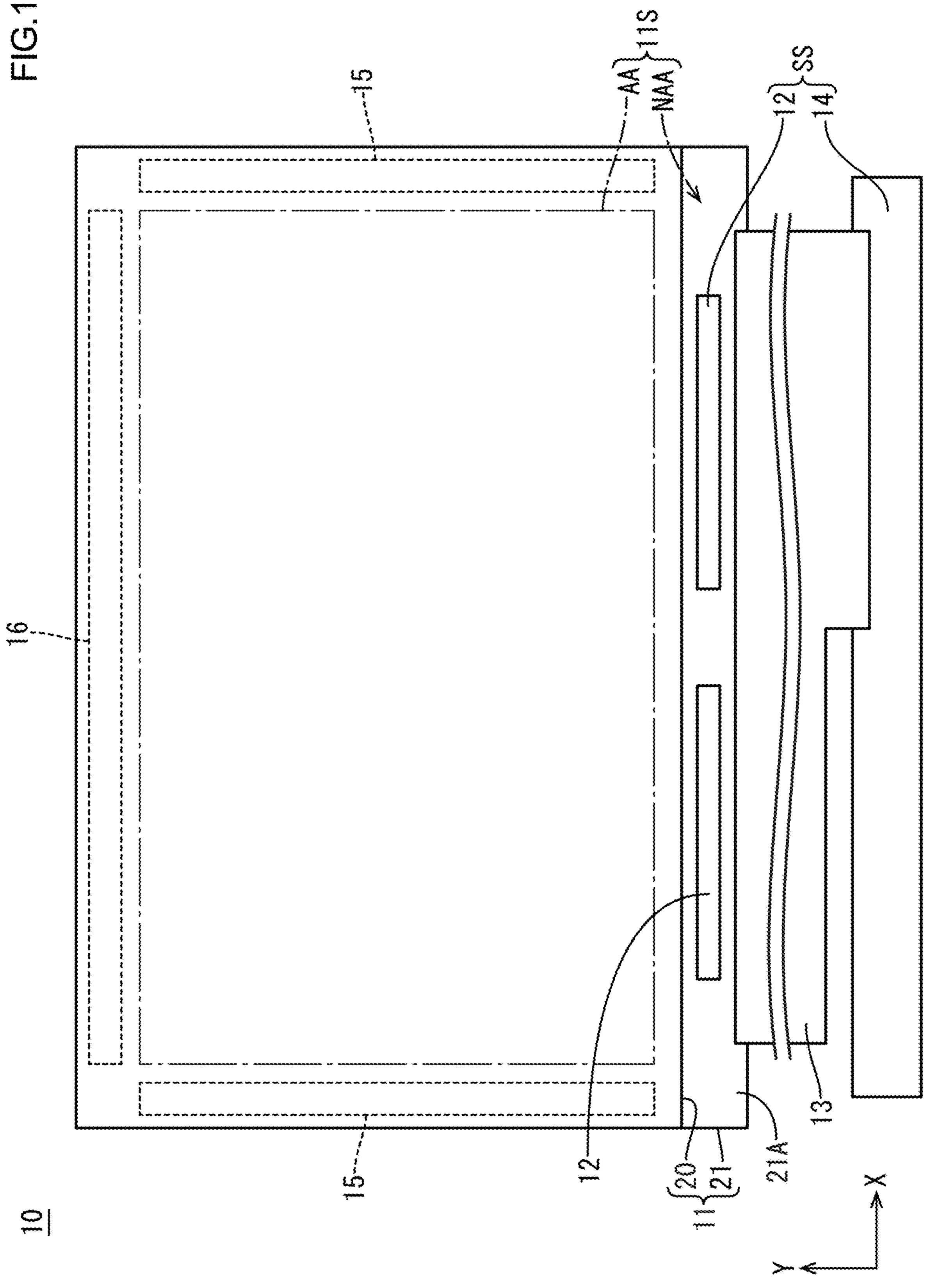
FIG. 1 is a plan view illustrating a liquid crystal panel, a driver, a flexible substrate, and a control board included in a liquid crystal display device according to a first embodiment.

A first embodiment will be described with reference to FIGS. 1 to 7. In this embodiment section, a liquid crystal display device 10 (a display device) will be described. X-axes, Y-axes, and Z-axes may be present in the drawings. The axes in each drawing correspond to the respective axes in other drawings. An upper side and a lower side in FIGS. 2, 4, and 5 correspond to a front side and a back side of the liquid crystal display device 10, respectively.

As illustrated in FIG. 1, the liquid crystal display device 10 at least includes a liquid crystal panel 11 (a display panel) that has a laterally long rectangular plan view shape and displays an image and a backlight unit (a lighting device) that supplies light to the liquid crystal panel 11 for displaying. The backlight unit is disposed behind (on a back surface side of) the liquid crystal panel 11. The backlight unit includes light sources configured to emit white light (e.g., LEDs) and optical members for converting the light from the light sources into planar light by applying optical effects to the light from the light sources. A middle section of a plate surface 11S of the liquid crystal panel 11 is configured as a display area AA in which images are displayed. An outer section in a frame shape surrounding the display area AA on the plate surface 11S of the liquid crystal panel 11 is configured as a non-display area NAA in which the images are not displayed.

The liquid crystal panel 11 will be described in detail with reference to FIGS. 1 and 2. As illustrated in FIGS. 1 and 2, the liquid crystal panel 11 includes a pair of substrates 20, 21 that are bonded to each other. One of the substrates 20, 21 on the front side is an opposed substrate 20 and another one on the back side is an array substrate 21. The opposed substrate 20 and the array substrate 21 include glass substrates and various kinds of films that are formed in layers on an inner surface side of the glass substrates. A liquid crystal layer 22 is disposed between the substrates 20 and 21. The liquid crystal layer 22 includes liquid crystal molecules having optical characteristics that vary according to application of electric field. A sealing portion 23 is disposed between the outer peripheral portions of the substrates 20, 21 for sealing the liquid crystal layer 22. The sealing portion 23 is formed in a frame shape and surrounds the liquid crystal layer 22. Polarizing plates 17 are attached to outer surfaces of the substrates 20 and 21.

As illustrated in FIGS. 1 and 2, the opposed substrate 20 has a short-side dimension that is smaller than a short-side dimension of the array substrate 21. The opposed substrate 20 is bonded to the array substrate 21 such that one of the long sides of the opposed substrate 20 is aligned with a corresponding one of the long sides of the array substrate 21. Therefore, a long side edge section including another one of the long sides of the array substrate 21 projects from another one of the long sides of the opposed substrate 20 and a projecting long side edge section is an uncovered section 21A. An entire area of the uncovered section 21A is the non-display area NAA and drivers 12 (a first signal supply section) that are components for supplying various signals and a flexible substrate 13 are mounted on the uncovered section 21A.

As illustrated in FIGS. 1 and 2, the drivers 12 are mounted on the uncovered section 21A of the array substrate 21 through the chip-on-glass (COG) technology. The drivers 12 are LSI chips including driver circuits therein. The driver 12 transmitted from the processes the various kinds of signals transmitted flexible substrate 13. The drivers 12 are disposed on the uncovered section 21A and on one side with respect to and adjacent to the display area AA in the Y-axis direction. The drivers 12 are disposed between the flexible substrate 13 and the display area AA. Two drivers 12 are disposed on the uncovered section 21A so as to be spaced with respect to the X-axis direction. The driver 12 has a laterally elongated rectangular plan view shape. The long side dimension of the driver 12 is shorter than the long side dimension of the display area AA.

The flexible substrate 13 includes a substrate made of synthetic resin (e.g., polyimide-based resin) having insulating property and flexibility and multiple traces formed on the substrate. As illustrated in FIGS. 1 and 2, a first end of the flexible substrate 13 is connected to the uncovered section 21A of the array substrate 21 and a second end of the flexible substrate 13 is connected to a control board 14 (a second signal supply section). The flexible substrate 13 is connected to an end of the uncovered section 21A that is an opposite end from the display area AA with respect to the drivers 12 in the Y-axis direction. Namely, the flexible substrate 13 is on a portion of the uncovered section 21A such that the drivers 12 are between the display area AA and the flexible substrate 13. The control board 14 includes a rigid substrate made of synthetic resin (such as phenol and glass epoxy resin) and circuit components that are mounted on the substrate. The circuit components include a power IC (integrated circuit), a timing controller that generates various kinds of signals to be supplied to the drivers 12, and a level shifter IC for controlling (decreasing and increasing) a voltage level. The control board 14 includes a connector portion that is connected to the flexible substrate 13. The flexible substrate 13 is folded such that the control board 14 is disposed behind the backlight unit. The flexible substrate 13 and the control board 14 are not disposed so as not to overlap the display area AA of the liquid crystal panel 11 on the front side (the display side) and therefore, this means that the flexible substrate 13 and the control board 14 are disposed in the non-display area NAA. In this embodiment, the drivers 12 and the control board 14 are configured as a signal supply section Ss that supplies signals to the lines included in the liquid crystal panel 11.

As illustrated in FIG. 1, gate driver circuits 15 and a first switching circuit 16 are disposed in the non-display area NAA of the array substrate 21. A pair of gate driver circuits 15 are disposed to sandwich the display area AA with respect to the X-axis direction. The gate driver circuit 15 is disposed in a belt shape area of the array substrate 21 extending in the short-side direction (the Y-axis direction). The gate driver circuits 15 are for supplying scan signals to gate lines 26, which will be described later, and are monolithically fabricated on the array substrate 21.

As illustrated in FIG. 1, the first switching circuit 16 is disposed in the non-display area NAA of the array substrate 21 such that the display area AA is between the first switching circuit 16 and the drivers 12 with respect to the Y-axis direction. The frame shaped non-display area NAA of the array substrate 21 includes four side portions and the first switching circuit 16 is disposed on one of the side portions that is on an opposite side from the one having the drivers 12 thereon. The first switching circuit 16 is disposed in a laterally elongated belt shape area of the array substrate 21 extending in the long-side direction (the X-axis direction). The first switching circuit 16 has a switching function of distributing the image signals supplied from the drivers 12 to source lines 27. The first switching circuit 16 is a so-called a source shared driving (SSD) circuit. A specific circuit configuration of the first switching circuit 16 will be described in detail.

Figure 3:
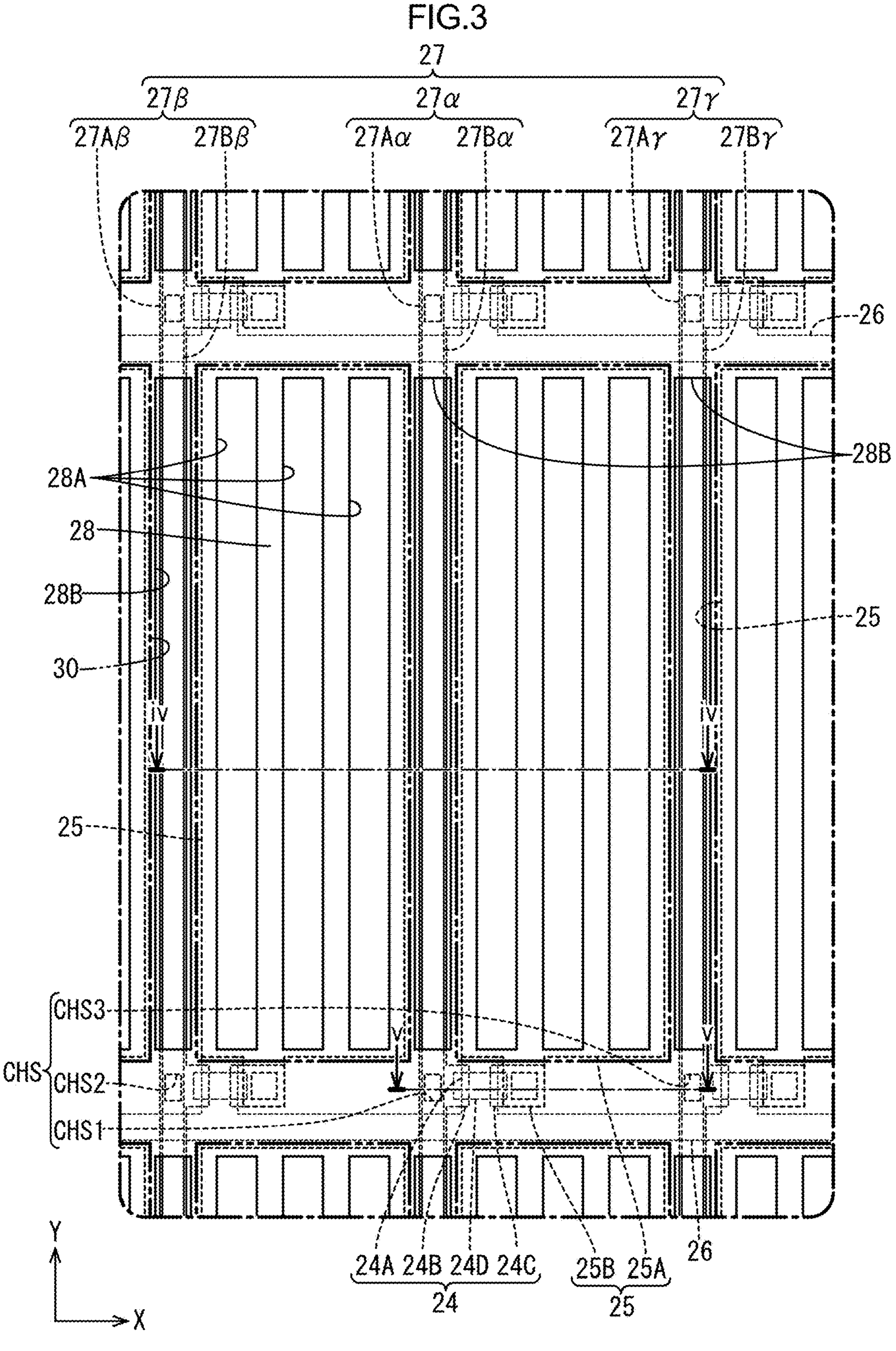
FIG. 3 is a plan view illustrating pixel arrangement of an array substrate of the liquid crystal panel according to the first embodiment.

Pixel arrangement of the array substrate 21 in the display area AA will be described with reference to FIG. 3. Configurations related to the opposed substrate 20 are illustrated with a two-dot chain line in FIG. 3. Films included in the array substrate 21 will be described in detail. As illustrated in FIG. 3, pixel TFTs 24 (pixel switching components) and pixel electrodes 25 are arranged on an inner surface of the array substrate 21 in the display area AA. The pixel TFTs 24 and the pixel electrodes 25 are arranged at intervals within a surface area of the array substrate 21. The pixel TFTs 24 and the pixel electrodes 25 are arranged at intervals in a matrix (rows and columns) along the X-axis direction and the Y-axis direction. Gate lines 26 (scanning lines) and source lines 27 (image lines, signal lines) are routed perpendicular to each other to surround the pixel TFTs 24 and the pixel electrodes 25. The gate lines 26 extend along the X-axis direction and are arranged at intervals with respect to the Y-axis direction to sandwich the pixel electrodes 25 therebetween. First ends of the gate lines 26 with respect to the X-axis direction are connected to the gate driver circuit 15. The source lines 27 extend along the Y-axis direction (a first direction) and are arranged at intervals with respect to the X-axis direction (a second direction crossing the first direction) to sandwich the pixel electrodes 25 therebetween. The source lines 27 cross the gate lines 26. First ends of the source lines 27 with respect to the Y-axis direction are connected to the first switching circuit 16.

As illustrated in FIG. 3, the pixel electrode 25 includes a pixel electrode body 25A having a vertically long rectangular plan view shape. The pixel electrode 25 includes a contact portion 25B that protrude from the pixel electrode body 25A toward one side along the Y-axis direction. The contact portion 25B protrudes toward a target pixel TFT 24 (downward in FIG. 3) and is disposed to overlap most portion of a pixel drain electrode 24C of the target pixel TFT 24. The contact portion 25B is a portion of the pixel electrode 25 that is connected to the pixel drain electrode 24C (refer to FIG. 5).

Figure 4:
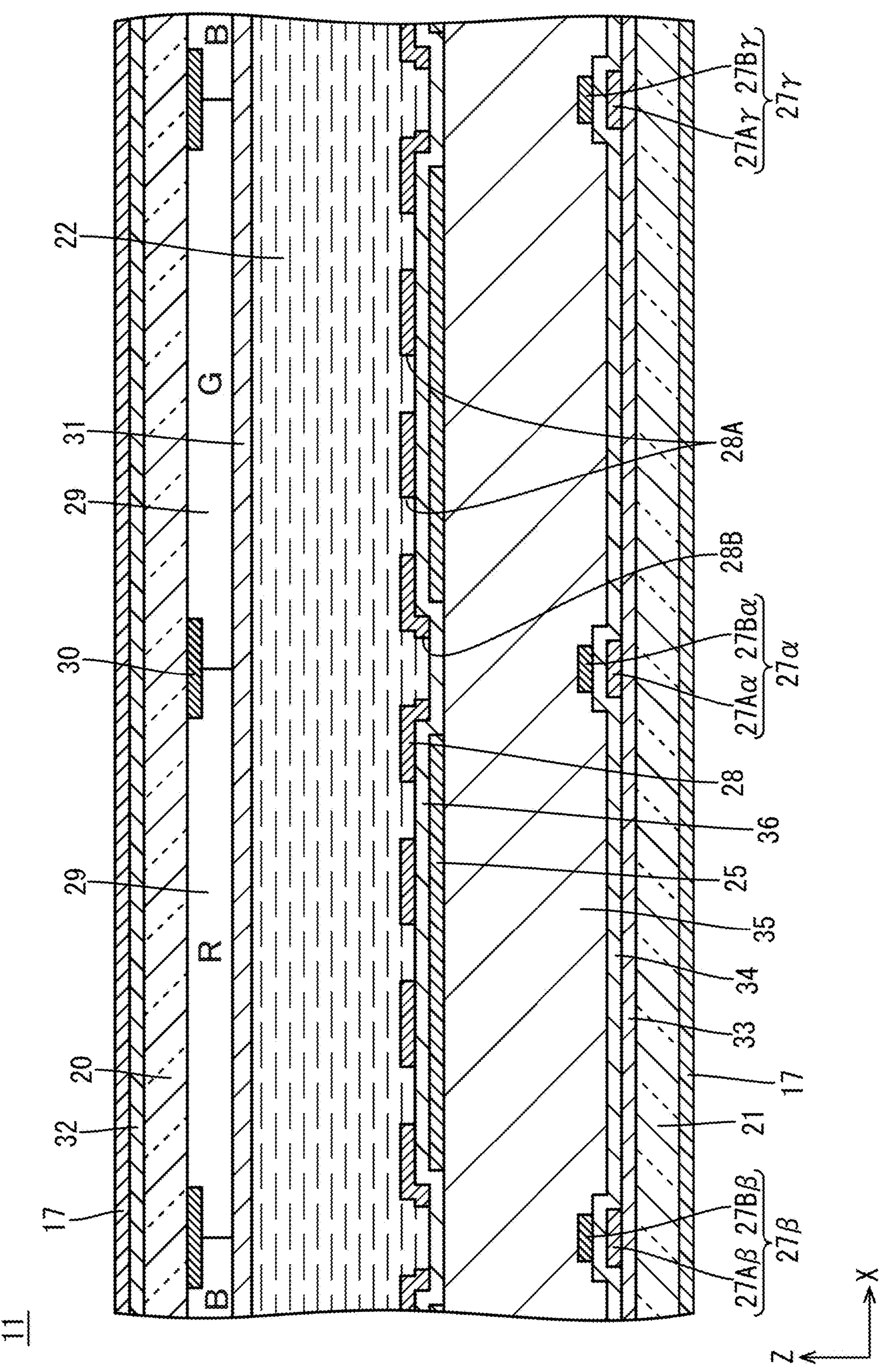
FIG. 4 is a cross-sectional view illustrating a portion of the liquid crystal panel according to the first embodiment along iv-iv line in FIG. 3.

A cross-sectional configuration of the pixel electrodes 25 in a middle section of the liquid crystal panel 11 with respect to the Y-axis direction will be described with reference to FIG. 4. As illustrated in FIG. 4, a common electrode 28 is formed on an inner surface side of the array substrate 21 in the display area AA to overlap all the pixel electrodes 25. The common electrode 28 is disposed on an upper layer side of the pixel electrodes 25. The common electrode 28 includes first openings 28A in a portion overlapping the pixel electrode 25. The first opening 28A extends along the long side (an outer shape) of the pixel electrode 25. The first openings 28A that overlap the pixel electrode 25 are arranged at intervals with respect to the X-axis direction. The common electrode 28 is supplied with a common potential signal (a reference potential signal) of a common potential (a reference potential) from the control board 14 via the flexible substrate 13. The common electrode 28 spreads over a substantially entire area of the display area AA. With the pixel electrode 25 being charged, a potential difference occurs between the pixel electrode 25 and the common electrode 28 that are overlapped. Then, a fringe electric field (an oblique electric field) is created between an opening edge of the first opening 28A of the common electrode 28 and the pixel electrode 25. The fringe electric field includes a component parallel to the plate surface of the array substrate 21 and a component normal to the plate surface of the array substrate 21. With the fringe electric field, orientations of the liquid crystal molecules included in the liquid crystal layer 22 can be controlled. Namely, the liquid crystal panel 11 according to this embodiment operates in the fringe field switching (FFS) mode.

As illustrated in FIG. 4, the common electrode 28 includes second openings 28B in portions overlapping the respective source lines 27 except for the portions crossing the gate lines 26. The second opening 28B has a vertically-long slit shape extending along the source line 27. A length of the second opening 28B is slightly smaller than a distance between the two gate lines 26 that sandwich the pixel electrode 25 with respect to the Y-axis direction. With the second opening 28B, a parasitic capacitance that may be caused between the source line 27 and the common electrode 28 is reduced.

As illustrated in FIG. 4, color filters 29 that exhibit three different colors of blue (B), green (G), and red (R) are disposed in the display area AA on the inner surface side of the opposed substrate 20 of the liquid crystal panel 11. The color filters 29 that exhibit different colors are arranged next to each other with respect to the direction in which the gate lines 26 extend (the X-axis direction) and the color filters 29 that exhibit different colors extend along the direction in which the source lines 27 extend (substantially the Y-axis direction). Namely, the color filters 29 that exhibit different colors are arranged in a stripe as a whole. The color filters 29 are arranged to overlap the pixel electrodes 25 of the array substrate 21, respectively, in a plan view. The color filter 29 and the corresponding pixel electrode 25 are configured as a pixel, which is a display unit. The color filters 29 that exhibit different colors are arranged such that a boundary therebetween (a color boundary) overlaps the source line 27. A light blocking portion 30 (an inter-pixel light blocking portion, a black matrix) is disposed on an inner surface side of the opposed substrate 20 and on a lower layer side of the color filters 29. The light blocking portion 30 is made of light blocking material having good light blocking properties. The light blocking portion 30 blocks light from the backlight unit. The light blocking portion 30 is formed in a grid pattern in a plan view in the display area AA to define each of the adjacent pixel electrodes 25 (pixels). The light blocking portion 30 is disposed to at least overlap the gate lines 26 and the source lines 27 on the array substrate 21 side. On an upper layer side (the liquid crystal layer 22 side) of the color filter 29, an overcoat film 31 is disposed in a solid manner on a substantially entire area of the opposed substrate 20 for planarization. A conductive film 32 is disposed in at least the display area AA on an outer surface side of the opposed substrate 20. The conductive film 32 is made of transparent electrode material and extends over a substantially entire area of the display area AA. Alignment films for orienting the liquid crystal molecules in the liquid crystal layer 22 are formed on innermost surfaces (in an uppermost layer) of the substrates 20 and 21 in contact with the liquid crystal layer 22.

Figure 5:
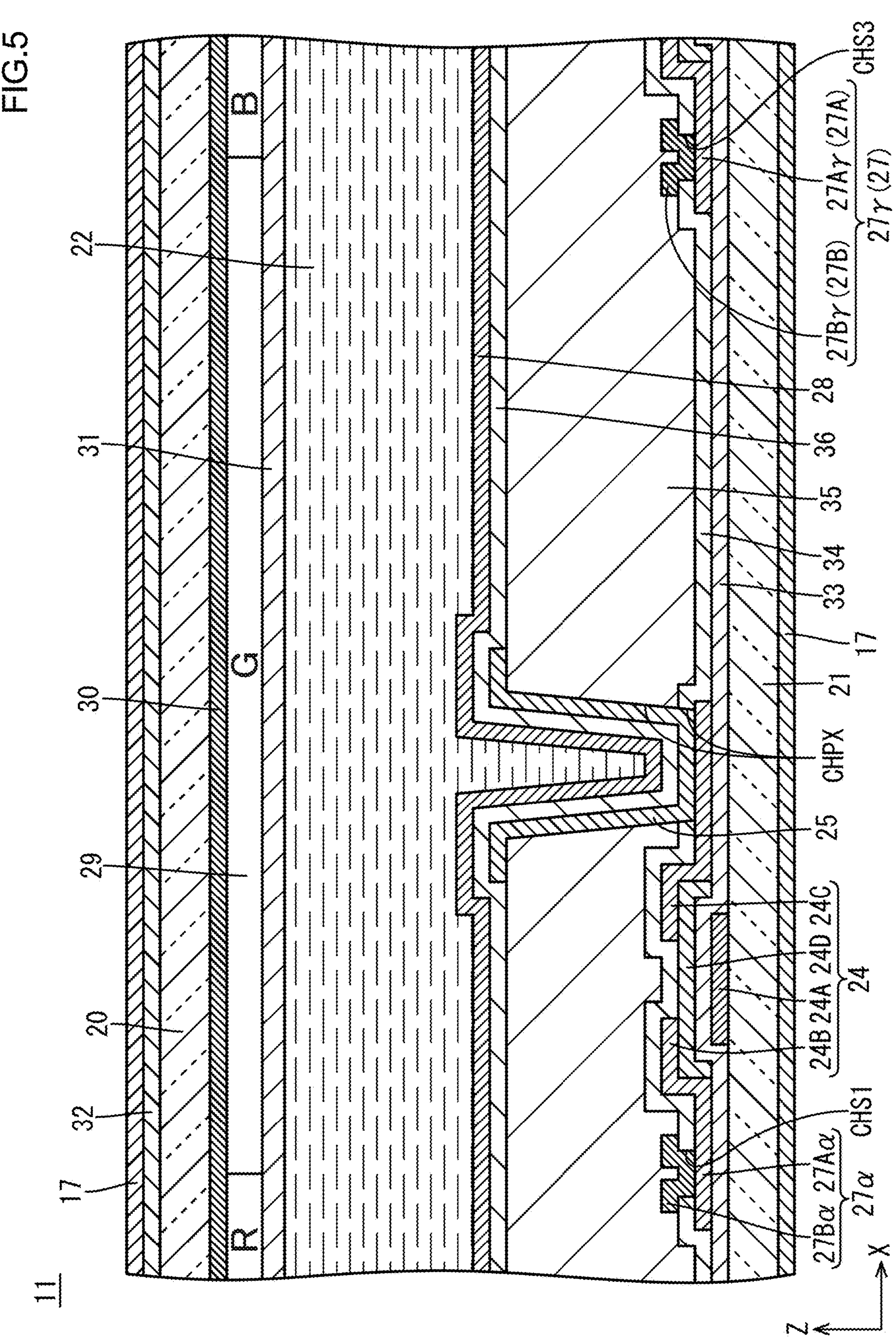
FIG. 5 is a cross-sectional view illustrating a portion of the liquid crystal panel according to the first embodiment along v-v line in FIG. 3.

Films disposed on top of each other on the inner surface side of the array substrate 21 will be described with reference to FIG. 5. FIG. 5 illustrates a cross-sectional configuration of a portion of the array substrate 21 near the pixel TFT 24. As illustrated in FIG. 5, on the array substrate 21, a first metal film, a gate insulating film 33, a semiconductor film, a second metal film (a first conductive film), a first interlayer insulating film 34 (a first insulating film), a third metal film (a second conductive film), a planarization film 35, a first transparent electrode film, a second interlayer insulating film 36, a second transparent electrode film, and an alignment film are disposed on top of each other in this sequence from a lower layer side (from the glass substrate side). The first metal film, the second metal film, and the third metal film may be a single-layer film made of one kind of metal, a multilayer film made of a material containing different kinds of metals, or an alloy. Examples of the metals include copper, titanium, aluminum, molybdenum, and tungsten. With such a configuration, the first metal film, the second metal film, and the third metal film have electrically conductive properties and light blocking properties. Portions of the first metal film are configured as the gate lines 26 and pixel gate electrodes 24A of the pixel TFTs 24. Portions of the second metal film are configured as portions of the source lines 27 and pixel source electrodes 24B and the pixel drain electrodes 24C of the pixel TFTs 24. Portions of the third metal film are configured as portions of the source lines 27. The semiconductor film is a thin film made of material such as oxide semiconductor and amorphous silicon and portions of the semiconductor film are configured as the pixel semiconductor portions 24D of the pixel TFTs 24. The first transparent electrode film and the second transparent electrode film are made of a transparent electrode material (e.g., indium tin oxide (ITO) and indium zinc oxide (IZO)). Portions of the first transparent electrode film are configured as the pixel electrodes 25. A portion of the second transparent electrode film is configured as the common electrode 28. Arrangement of the alignment films is as previously described.

The gate insulating film 33, the first interlayer insulating film 34, and the second interlayer insulating film 36 are made of an inorganic material such as silicon nitride ($SiN_X$) and silicon oxide ($SiO_2$). The planarization film 35 is made of an organic material such as PMMA (acrylic resin) and is much thicker than the gate insulating film 33, the first interlayer insulating film 34, and the second interlayer insulating film 36. The planarization film 35 planarizes the inner surface (a surface opposite the liquid crystal layer 22) of the array substrate 21. The gate insulating film 33 insulates the first metal film in the lower layer from the semiconductor film and the second metal film in the upper layer. For example, in crossing portions of the gate lines 26, which are portions of the first metal film, and the source lines 27, which are portions of the second metal film, the gate lines 26 and the source lines 27 are insulated from each other by the gate insulating film 33. In the pixel TFT 24, in an overlapping portion of the pixel gate electrode 24A, which is a portion of the first metal film, and the pixel semiconductor section 24D, which is a portion of the semiconductor film, the pixel gate electrode 24A and the pixel semiconductor section 24D are insulated from each other by the gate insulating film 33. The first interlayer insulating film 34 insulates the semiconductor film and the second metal film in the lower layer from the third metal film in the upper layer. The planarization film 35 insulates the third metal film in the lower layer from the first transparent electrode film in the upper layer. The second interlayer insulating film 36 insulates the first transparent electrode film in the lower layer from the second transparent electrode film in the upper layer. For example, in an overlapping portion of the pixel electrode 25, which is a portion of the first transparent electrode film, and the common electrode 28, which is a portion of the second transparent electrode film, the pixel electrode 25 and the common electrode 28 are insulated from each other by the second interlayer insulating film 36.

Next, a cross-sectional configuration of the pixel TFT 24 will be described. As illustrated in FIG. 5, the pixel TFT 24 includes the pixel gate electrode 24A that is a portion of the first metal film. The pixel gate electrode 24A is a wide section of the gate line 26 that crosses the source line 27 (refer to FIG. 3). The pixel TFTs 24 are driven based on scan signals supplied to the pixel gate electrodes 24A through the gate lines 26. The pixel TFT 24 includes the pixel source electrode 24B that is a portion of the second metal film. The pixel source electrode 24B is a wide section of the source line 27 that crosses the gate line 26 (refer to FIG. 3). The pixel source electrode 24B is on one end of the pixel TFT 24 with respect to the X-axis direction (a left end in FIG. 5). The pixel source electrode 24B overlaps a portion of the pixel gate electrode 24A and is connected to the pixel semiconductor portion 24D.

As illustrated in FIG. 5, the pixel TFT 24 includes a pixel drain electrode 24C that is a portion of the second metal film. The pixel drain electrode 24C is away from the pixel source electrode 24B with respect to the X-axis direction and is on the other end of the pixel TFT 24 with respect to the X-axis direction (a right end in FIG. 5). An end portion of the pixel drain electrode 24C closer to the pixel source electrode 24B overlaps a portion of the pixel gate electrode 24A and is connected to the pixel semiconductor portion 24D. Another end portion of the pixel drain electrode 24C that is opposite from the one end portion closer to the pixel source electrode 24B overlaps the contact portion 25B of the pixel electrode 25. The first interlayer insulating film 34 and the planarization film 35 include a pixel contact hole CHPX in portions each of which overlaps the pixel drain electrode 24C and the contact portion 25B of the pixel electrode 25. The pixel drain electrode 24C and the contact portion 25B of the pixel electrode 25 are connected through the pixel contact hole CHPX.

As illustrated in FIG. 5, the pixel TFT 24 includes the pixel semiconductor section 24D that includes a channel portion and has an island shape. The pixel semiconductor section 24D has a laterally-long shape extending along the X-axis direction. The pixel semiconductor section 24D overlaps the pixel gate electrode 24A via the gate insulating film 33. One end portion of the pixel semiconductor section 24D is connected to the pixel source electrode 24B. Other end portion of the pixel semiconductor section 24D is connected to the pixel drain electrode 24C. The pixel semiconductor section 24D includes a portion that overlaps the pixel gate electrode 24A and does not overlap the pixel source electrode 24B and the pixel drain electrode 24C and the portion is the channel portion that is configured as a channel (a current path). With the pixel TFT 24 being turned on based on the scanning signal supplied to the pixel gate electrode 24A, the image signal (data signal) supplied to the source line 27 is supplied from the pixel source electrode 24B to the pixel drain electrode 24C via the pixel semiconductor section 24D. As a result, the pixel electrode 25 is charged at the potential related to the image signal.

Next, a configuration of the source line 27 will be described. As illustrated in FIGS. 4 and 5, the source line 27 includes a lower layer portion 27A that is a portion of the second metal film and an upper layer portion 27B that is a portion of the third metal film. The lower layer portion 27A and the upper layer portion 27B overlap and the first interlayer insulating film 34 is disposed between the lower layer portion 27A and the upper layer portion 27B. As illustrated in FIGS. 3 and 5, the first interlayer insulating film 34 includes source line contact holes CHS in portions each of which overlaps the lower layer portion 27A and the upper layer portion 27B. The lower layer portion 27A and the upper layer portion 27B are connected via the source line contact hole CHS. The source line contact hole CHS is adjacent to the pixel source electrode 24B of the pixel TFT 24 with respect to the X-axis direction. The lower layer portion 27A, which is a portion of the second metal film, is directly continuous to the pixel source electrode 24B, which is a portion of the second metal film, of the pixel TFT 24.

Figure 6:
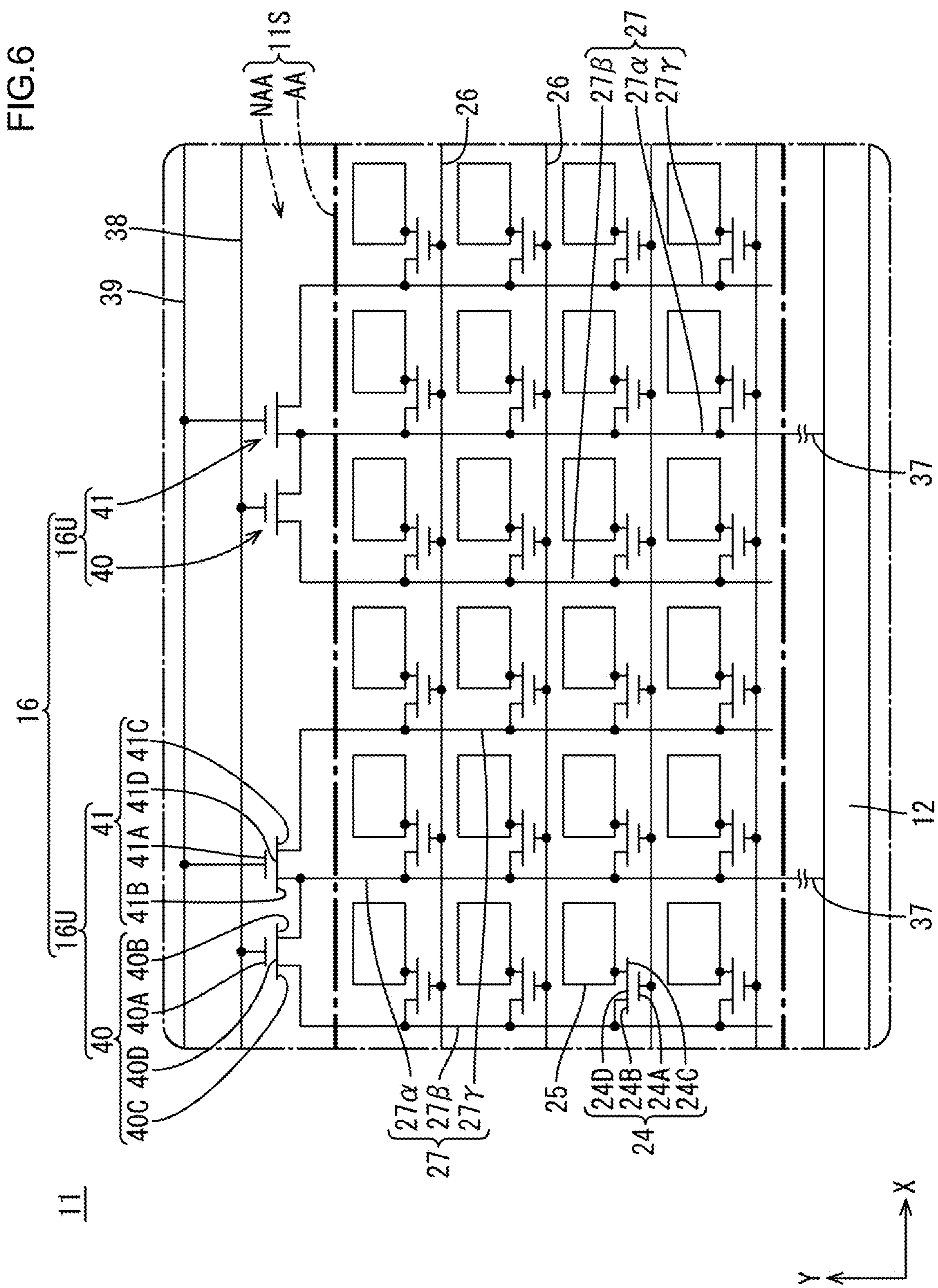
FIG. 6 is a circuit diagram illustrating an electrical configuration of the liquid crystal panel according to the first embodiment.

As illustrated in FIG. 6, a connection line 37 that is connected to the driver 12 and a particular one of the source lines 27 (a first source line 27α) is disposed in the non-display area NAA of the array substrate 21. The frame shaped non-display area NAA on the array substrate 21 includes four side portions. The connection line 37 is disposed on one of the four side portions closer to the driver 12 and extends from the area where the driver 12 is arranged to the display area AA. The connection line 37 is supplied with image signals from the driver 12, which is the signal supply section SS. The source lines 27 include the first source lines 27α (a first line), second source lines 27β (a second line), and third source lines 27γ (a third line). The first source lines 27α are connected to the connection lines 37. The second source line 27 is next to and on a left side of the first source line 27α in FIG. 6. The second source line 27β is spaced from the first source line 27α. The third source line 27γ is next to and on a right side of the first source line 27α in FIG. 6. The third source line 27γ is spaced from the first source line 27α.

In this embodiment, as illustrated in FIG. 6, the connection line 37 is connected to the first source line 27α but is not connected to the second source line 27β and the third source line 27γ. Therefore, the number of connection lines 37 is smaller than the number of source lines 27 and is about one third of the number of source lines 27, for instance. The first source line 27α, the second source line 27β, and the third source line 27γ are connected to the first switching circuit 16. Image signals that are supplied from the driver 12 to the connection line 37 are supplied to the first switching circuit 16 via the first source line 27α. Namely, the image signals, which are supplied from the connection line 37, are transmitted to the first switching circuit 16 (the second source line 27β and the third source line 27γ) through the first source line 27α. The image signals, which are supplied from the connection line 37 to the first source line 27α, are distributed to the second source line 27β and the third source line 27γ, which are not connected to the connection line 37, by the first switching circuit 16. A configuration of the first switching circuit 16 will be described in detail.

As illustrated in FIG. 6, the first switching circuit 16 includes unit switching circuits 16U and switching lines 38, 39. The unit switching circuits 16U are arranged along an extending direction (the X-axis direction) in which the first switching circuit 16 extends. The first switching circuit 16 is illustrated with a dashed line in FIG. 1 and the unit switching circuits 16U are disposed in the area illustrated with the dashed line. The number of unit switching circuits 16U is same as that of the connection lines 37 and is about one third of the number of source lines 27. The switching lines 38, 39 include a first switching line 38 and a second switching line 39. The first switching line 38 and the second switching line 39 extend along the X-axis direction in the area where the unit switching circuits 16U are disposed. The first switching line 38 and the second switching line 39 extend to the outside of the area where the unit switching circuits 16U are disposed and extend in the non-display area NAA of the array substrate 21 along the gate driver circuit 15 (the Y-axis direction) and are connected to the flexible substrate 13. The first switching line 38 and the second switching line 39 are supplied with switching signals from the control board 14, which is the signal supply section SS, via the flexible substrate 13. The control board 14 is configured to output a switch signal to the first switching line 38 and a switch signal to the second switching line 39 at different timings. The voltage of the switch signals is higher than a threshold voltage of a first switching TFT 40 and a second switching s TFT 41, which will be described later.

As illustrated in FIG. 6, the unit switching circuit 16U includes the first switching TFT 40 (a first switching component) and the second switching TFT 41 (a second switching component). The first switching TFT 40 is connected to the first switching line 38, the first source line 27α, and the second source line 27β. The second switching TFT 41 is connected to the second switching line 39, the first source line 27α, and the third source line 27γ. The first switching TFT 40 includes a first gate electrode 40A that is connected to the first switching line 38, a first source electrode 40B that is connected to the first source line 27α, a first drain electrode 40C that is connected to the second source line 27β, and a first semiconductor section 40D that is connected to the first source electrode 40B and the first drain electrode 40C. The second switching TFT 41 includes a second gate electrode 41A that is connected to the second switching line 39, a second source electrode 41B that is connected to the first source line 27α, a second drain electrode 41C that is connected to the third source line 27γ, and a second semiconductor section 41D that is connected to the second source electrode 41B and the second drain electrode 41C. The first switching TFT 40 and the second switching TFT 41 have a configuration similar to that of the pixel TFT 24 (refer to FIG. 5). Specifically, the first gate electrode 40A and the second gate electrode 41A are portions of the first metal film a portion of which is configured as the pixel gate electrode 24A. The first source electrode 40B, the first drain electrode 40C, the second source electrode 41B, and the second drain electrode 41C are portions of the second metal film portions of which are configured as the pixel source electrode 24B and the pixel drain electrode 24C. The first semiconductor section 40D and the second semiconductor section 41D are portions of the semiconductor film a portion of which is configured as the pixel semiconductor section 24D. The first source line 27α, the second source line 27β, and the third source line 27γ extend to the non-display area NAA and ends of the source lines 27α, 27β, 27γ that are an opposite side from the drivers 12 with respect to the Y-axis direction are connected to the corresponding switching TFT 40, 41.

Operations of the first switching circuit 16 will be described. A switching signal is supplied from the control board 14, which is the signal supply section SS, to the first switching line 38 via the flexible substrate 13. Then, the switching signal is supplied to the first gate electrode 40A from the first switching line 38 and the first switching TFT 40 is driven. At this time, with the image signal being supplied to the connection line 37 from the driver 12, which is the signal supply section SS, the image signal is supplied through the first source line 27α to the first source electrode 40B, the first semiconductor section 40D, and the first drain electrode 40C of the first switching TFT 40 and supplied to the second source line 27β. The image signal supplied to the second source line 27β is supplied to a target pixel electrode 25 (that is included in a column of pixel electrodes 25 that are connected to the second source line 27β) via the pixel source electrode 24B, the pixel semiconductor section 24D, and the pixel drain electrode 24C of the pixel TFT 24 that is connected to the gate line 26 supplied with the scanning signal by the gate driver circuit 15. Then, the target pixel electrode 25 is charged at a potential based on the image signal.

A switching signal is supplied from the control board 14, which is the signal supply section SS, to the second switching line 39 via the flexible substrate 13 at a timing different from the timing when the switching signal is supplied to the first switching line 38. Then, the switching signal is supplied to the second gate electrode 41A from the second switching line 39 and the second switching TFT 41 is driven. At this time, with the image signal being supplied to the connection line 37 from the driver 12, which is the signal supply section SS, the image signal is supplied through the first source line 27α to the second source electrode 41B, the second semiconductor section 41D, and the second drain electrode 41C of the second switching TFT 41 and supplied to the third source line 27γ. The image signal supplied to the third source line 27γ is supplied to a target pixel electrode 25 (that is included in a column of pixel electrodes 25 that are connected to the third source line 27γ) via the pixel source electrode 24B, the pixel semiconductor section 24D, and the pixel drain electrode 24C of the pixel TFT 24 that is connected to the gate line 26 supplied with the scanning signal by the gate driver circuit 15. Then, the target pixel electrode 25 is charged at a potential based on the image signal.

An image signal is supplied from the signal supply section SS to the connection line 37 at a timing when no switching signal is supplied from the control board 14, which is the signal supply section SS, to the first switching line 38 and the second switching line 39. The image signal is supplied to the first source line 27α from the connection line 37; however, both of the first switching TFT 40 and the second switching TFT 41 are not driven and therefore, the mage signal is not supplied to the second source line 27β and the third source line 27γ. The image signal supplied to the first source line 27α is supplied to a target pixel electrode 25 (that is included in a column of pixel electrodes 25 that are connected to the first source line 27α) via the pixel source electrode 24B, the pixel semiconductor section 24D, and the pixel drain electrode 24C of the pixel TFT 24 that is connected to the gate line 26 supplied with the scanning signal by the gate driver circuit 15. Then, the target pixel electrode 25 is charged at a potential based on the image signal.

Thus, by controlling the driving of the first switching TFT 40 and the second switching TFT 41, the image signals can be supplied to the first source line 27α, the second source line 27β, and the third source line 27γ. With a switching TFT being connected to each of the first source line 27α, the second source line 27β, and the third source line 27γ, one unit switching circuit necessarily includes three switching TFTs. In this respect, in this embodiment, the unit switching circuit 16U includes two switching TFTs 40, 41 and the number of switching TFTs 40, 41 can be reduced. This is preferable to decrease a frame width of the liquid crystal panel 11 and improve abilities of the switching TFTs 40 by increasing the size of the first switching TFT 40 and the second switching TFT 41.

In this embodiment, as illustrated in FIG. 6, the first source line 27α that is connected to the connection line 37 is disposed between the second source line 27β and the third source line 27γ with respect to the X-axis direction. The first source line 27α is connected to the first switching TFT 40 and the second switching TFT 41 and is disposed between the second source line 27β and the third source line 27γ. With such a configuration, the first source line 27α is easily routed to be connected to the first source electrode 40B of the first switching TFT 40 and the second source electrode 41B of the second switching TFT 41. Accordingly, a parasitic capacitance that may be caused between the first source line 27α and other line can be reduced and a load on the first source line 27α can be reduced. With the load on the first source line 27α being reduced, delay is less likely to be caused on the image signal that is transferred and this preferably improves display quality.

In this embodiment, as illustrated in FIG. 6, the driver 12 and the first switching TFTs 40 and the second switching TFTs 41 are disposed to have the display area AA between the driver 12 and each of the first switching TFTs 40 and the second switching TFTs 41 with respect to the Y-axis direction. The driver 12 and each of the first switching TFTs 40 and the second switching TFTs 41 are disposed away from each other on two sides with respect to the Y-axis direction in the liquid crystal panel 11. Therefore, the frame width of the liquid crystal panel 11 is preferably decreased compared to a configuration in which the first switching TFTs 40 and the second switching TFTs 41 are disposed on the same side as the driver 12 with respect to the Y-axis direction in the liquid crystal panel 11. The first source line 27α has a first end close to the driver 12 with respect to the Y-axis direction and a second end that is opposite from the first end. The first end is connected to the connection line 37 and the second end that is an opposite side from the driver 12 is connected to the source electrodes 40B, 41B of the first switching TFT 40 and the second switching TFT 41. The end of the second source line 27β that is an opposite side from the driver 12 is connected to the first drain electrode 40C of the first switching TFT 40. The end of the third source line 27γ that is an opposite side from the driver 12 is connected to the second drain electrode 41C of the second switching TFT 41.

Furthermore, as illustrated in FIG. 6, the first switching line 38 and the second switching line 39 are disposed such that the first switching TFTs 40 and the second switching TFTs 41 are disposed between the first and second switching lines 38, 39 and the display area AA. Thus, the first switching line 38 and the second switching line 39 are disposed on an opposite side from the display area AA in the Y-axis direction with respect to the first switching TFT 40 including the first source electrode 40B, which is connected to the first source line 27α, and the second switching TFT 41 including the second source electrode 41B, which is connected to the first source line 27α. Therefore, the first source line 27α does not cross the first switching line 38 and the second switching line 39. Accordingly, a parasitic capacitance that may be caused between the first source line 27α and each of the first switching line 38 and the second switching line 39 can be reduced and a load on the first source line 27α can be reduced.

As illustrated in FIG. 6, the first switching TFT 40 and the second switching TFT 41 are disposed to sandwich the first source line 27α therebetween with respect to the X-axis direction. The first switching TFT 40 is disposed on a left side of the first source line 27α in FIG. 6 or on the second source line 27β side with respect to the first source line 27α in the X-axis direction. The first source electrode 40B of the first switching TFT 40 is disposed on the right side or on the first source line 27α side with respect to the first gate electrode 40A. The first drain electrode 40C of the first switching TFT 40 is disposed on the left side or on the second source line 27β side with respect to the first gate electrode 40A. The second switching TFT 41 is disposed on a right side of the first source line 27α in FIG. 6 or on the third source line 27γ side with respect to the first source line 27α in the X-axis direction. The second source electrode 41B of the second switching TFT 41 is disposed on the left side or on the first source line 27α side with respect to the second gate electrode 41A. The second drain electrode 41C of the second switching TFT 41 is disposed on the right side or on the third source line 27γ side with respect to the second gate electrode 41A. With the first source line 27α being disposed between the first switching TFT 40 and the second switching TFT 41 with respect to the X-axis direction, the first source line 27α can be easily connected to the first source electrode 40B of the first switching TFT 40 and the second electrode 41B of the second switching TFT 41.

As illustrated in FIGS. 4 and 5, the first source line 27α includes a first line portion 27Aα and a second line portion 27Bα. The first line portion 27Aα is the lower layer portion 27A and is a portion of the second metal film. The second line portion 27Bα is the upper layer portion 27B and is a portion of the third metal film. The first line portion 27Aα and the second line portion 27Bα overlap and the first interlayer insulating film 34 is disposed between the first line portion 27Aα and the second line portion 27Bα. As illustrated in FIGS. 3 and 5, the first interlayer insulating film 34 includes a first contact hole CHS1, which is the source line contact hole CHS, in a portion overlapping the first line portion 27Aα and the second line portion 27Bα. The first line portion 27Aα and the second line portion 27Bα are connected via the first contact hole CHS1. The first line portion 27Aα, which is a portion of the second metal film, is directly continuous to the first source electrode 40B and the second source electrode 41B, which are portions of the second metal film. With such a configuration, the resistance of the first source line 27α can be reduced compared to a configuration in which the first source line 27α includes only one of the first line portion 27Aα or the second line portion 27Bα. Accordingly, delay is less likely to be caused on the image signal that is transferred via the first source line 27α. Particularly, since the second source line 27β and the third source line 27γ are supplied with image signals via the first source line 27α, delay is also less likely to be caused on the image signals that are transferred via the second source line 27β and the third source line 27γ.

As illustrated in FIG. 4, the second source line 27β includes a third line portion 27Aβ and a fourth line portion 27Bβ. The third line portion 27Aβ is the lower layer portion 27A and is a portion of the second metal film. The fourth line portion 27Bβ is the upper layer portion 27B and is a portion of the third metal film. The third line portion 27Aβ and the fourth line portion 27Bβ overlap and the first interlayer insulating film 34 is disposed between the third line portion 27Aβ and the fourth line portion 27Bβ. As illustrated in FIG. 3, the first interlayer insulating film 34 includes a second contact hole CHS2, which is the source line contact hole CHS, in a portion overlapping the third line portion 27Aβ and the fourth line portion 27Bβ. The third line portion 27Aβ and the fourth line portion 27Bβ are connected via the second contact hole CHS2. The third line portion 27Aβ, which is a portion of the second metal film, is directly continuous to the first drain electrode 40C, which is a portion of the second metal film. With such a configuration, the resistance of the second source line 27β can be reduced compared to a configuration in which the second source line 27β includes only one of the third line portion 27Aβ or the fourth line portion 27Bβ. Accordingly, delay is less likely to be caused on the image signal that is transferred via the second source line 27β.

As illustrated in FIGS. 4 and 5, the third source line 27γ includes a fifth line portion 27Aγ and a sixth line portion 27Bγ. The fifth line portion 27Aγ is the lower layer portion 27A and is a portion of the second metal film and the sixth line portion 27Bγ is the upper layer portion 27B and is a portion of the third metal film. The fifth line portion 27Aγ and the sixth line portion 27Bγ overlap and the first interlayer insulating film 34 is disposed between the fifth line portion 27Aγ and the sixth line portion 27Bγ. As illustrated in FIGS. 3 and 5, the first interlayer insulating film 34 includes a third contact hole CHS3, which is the source line contact hole CHS, in a portion overlapping the fifth line portion 27Aγ and the sixth line portion 27Bγ. The fifth line portion 27Aγ and the sixth line portion 27Bγ are connected via the third contact hole CHS3. The fifth line portion 27Aγ, which is a portion of the second metal film, is directly continuous to the second drain electrode 41C, which is a portion of the second metal film. With such a configuration, the resistance of the third source line 27γ can be reduced compared to a configuration in which the third source line 27γ includes only one of the fifth line portion 27Aγ or the sixth line portion 27Bγ. Accordingly, delay is less likely to be caused on the image signal that is transferred via the third source line 27γ.

Figure 7:
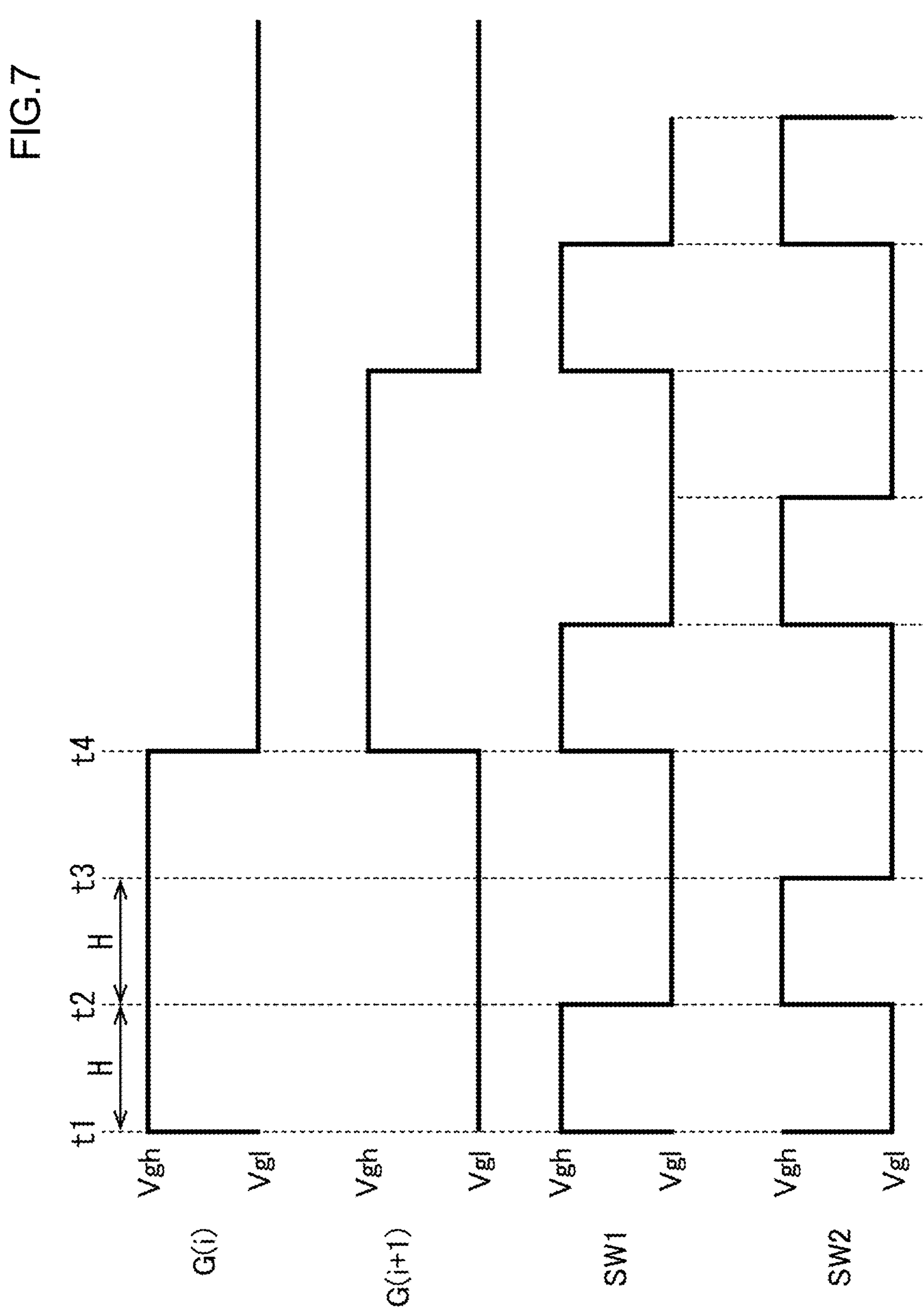
FIG. 7 is a timing chart related to operations of a gate driver circuit and a first switching circuit according to the first embodiment.

Next, the detailed operation of the first switching circuit 16 will be described with reference to FIG. 7. FIG. 7 is a timing chart related to the operations of the first switching circuit 16. FIG. 7 illustrates waveforms of signals transmitted via the gate lines 26, the first switching line 38, and the second switching line 39. In FIG. 7, each scale mark represents one unit period H (one horizontal period). Specifically, the signal waveforms of a first scanning signal G(i) transmitted via the gate line 26 that is the ith (hereinafter, i represents an integer of 1 or greater) one from the above in FIG. 6, a second scanning signal G(i+1) transmitted via the gate line 26 that is the i+1th one from the above in FIG. 6, a first switching signal SW1 transmitted via the first switching line 38, and a second switching signal SW2 transmitted via the second switching line 39 are illustrated in this order from the above in FIG. 7.

As illustrated in FIG. 7, the potential of a high level (hereinafter, referred to as a high potential) of the first scanning signal G(i), the second scanning signal G(i+1), the first switching signal SW1, and the second switching signal SW2 is represented by Vgh and is higher than the threshold voltage of each of the switching TFTs 40, 41. The potential of a low level (hereinafter, referred to as a low potential) of the first scanning signal G(i), the second scanning signal G(i+1), the first switching signal SW1, and the second switching signal SW2 is represented by Vgl and is lower than the threshold voltage of each of the switching TFTs 40, 41. The first switching signal SW1 and the second switching signal SW2 have substantially a square signal waveform such that the high potential Vgh for one unit period H and the low potential Vgl for continuous two unit periods H are repeated periodically. The first switching signal SW1 and the second switching signal SW2 are synchronized such that the falling edge timing of the first switching signal SW1 falling from the high potential Vgh to the low potential Vgl matches the rising edge timing of the second switching signal SW2 rising from the low potential Vgl to the high potential Vgh. The control board 14, which is the signal supply section SS, applies the high potential Vgh to the first switching line 38 and the second switching line 39 at different timings.

As illustrated in FIG. 7, the first scanning signal G(i) and the second scanning signal G(i+1) have a signal waveform that includes the high potential Vgh for continuous three unit periods H in one frame display period and the low potential Vgl for the rest of the unit periods H. The first scanning signal G(i) and the second scanning signal G(i+1) are synchronized such that the falling edge timing of the first scanning signal G(i) falling from the high potential Vgh to the low potential Vgl matches the rising edge timing of the second scanning signal G(i+1) rising from the low potential Vgl to the high potential Vgh. Each of the first and second scanning signals G(i), G(i+1) and the first switching signal SW1 are synchronized such that the rising edge timing of the first and second scanning signals G(i), G(i+1) rising from the low potential Vgl to the high potential Vgh matches the rising edge timing of the first switching signal SW1 rising from the low potential Vgl to the high potential Vgh. Each of the first and second scanning signals G(i), G(i+1) and the first switching signal SW1 are synchronized such that the falling edge timing of the first and second scanning signals G(i), G(i+1) falling from the high potential Vgh to the low potential Vgl matches the rising edge timing of the first switching signal SW1 rising from the low potential Vgl to the high potential Vgh.

The operation of the first switching circuit 16 will be described more in detail. As illustrated in FIG. 7, when the high potential Vgh of the first scanning signal G(i) is output to the ith gate line 26 from the gate driver circuit 15 (timing t1), the high potential Vgh of the first switching signal SW1 is output to the first switching line 38 from the control board 14. For a period from the timing t1 to the falling edge timing of the first switching signal SW1 falling from the high potential Vgh to the low potential Vgl (timing t2), the first switching TFT 40 is driven. While the first switching TFT 40 is driven, the image signal supplied from the driver 12 to the connection line 37 is supplied to the second source line 27β via the first source line 27α. Therefore, the pixel TFT 24 that is connected to the ith gate line 26 and the second source line 27β is driven and the pixel electrode 25 that is connected to the pixel TFT 24, which is connected to the ith gate line 26 and the second source line 27β, is charged at a potential according to the image signal supplied to the second source line 27β. The pixel TFT 24 that is connected to the ith gate line 26 and the first source line 27α is also driven and the pixel electrode 25 that is connected to the pixel TFT 24, which is connected to the ith gate line 26 and the first source line 27α, is charged at a potential according to the image signal supplied to the first source line 27α.

At the timing t2, the first scanning signal G(i) is maintained at the high potential Vgh and the high potential Vgh of the second switching signal SW2 is output to the second switching line 39 from the control board 14. For a period from the timing t2 to the falling edge timing of the second switching signal SW2 falling from the high potential Vgh to the low potential Vgl (timing t3), the second switching TFT 41 is driven. While the second switching TFT 41 is driven, the image signal supplied from the driver 12 to the connection line 37 is supplied to the third source line 27γ via the first source line 27α. Therefore, the pixel TFT 24 that is connected to the ith gate line 26 and the third source line 27γ is driven and the pixel electrode 25 that is connected to the pixel TFT 24, which is connected to the ith gate line 26 and the third source line 27γ, is charged at a potential according to the image signal supplied to the third source line 27γ. The pixel TFT 24 that is connected to the ith gate line 26 and the first source line 27α is also driven and the pixel electrode 25 that is connected to the pixel TFT 24, which is connected to the ith gate line 26 and the first source line 27α, is charged at a potential according to the image signal supplied to the first source line 27α.

For a period from the timing t3 to the falling edge timing of the first scanning signal G(i) falling from the high potential Vgh to the low potential Vgl (timing t4), the first scanning signal G(i) is maintained at the high potential Vgh and the first switching signal SW1 and the second switching signal SW2 are maintained at the low potential Vgl, and the switching TFTs 40, 41 are not driven. Therefore, during the period from the timing t3 to the timing t4, the image signal supplied from the driver 12 to the connection line 37 is selectively supplied to the first source line 27α and is not supplied to the second source line 276 and the third source line 27γ. Accordingly, the pixel TFT 24 that is connected to the ith gate line 26 and the first source line 27α is selectively driven and the pixel electrode 25 that is connected to the pixel TFT 24, which is connected to the ith gate line 26 and the first source line 27α, is charged at a potential according to the image signal selectively supplied to the first source line 27α.

Thus, the pixel TFT 24 that is connected to the ith gate line 26 and the first source line 27α is ON while the first scanning signal G(i) is maintained at the high potential Vgh (from the timing t1 to the timing t4). Therefore, the pixel TFT 24, which is connected to the ith gate line 26 and the first source line 27α, is charged at a potential according to the image signal supplied to the second source line 27β for the period from the timing t1 to the timing t2 and is charged at a potential according to the image signal supplied to the third source line 27γ for the period from the timing t2 to the timing t3, and is rewritten to be charged at a potential according to the image signal supplied to only the first source line 27α for the period from the timing t3 to the timing t4. Accordingly, the display shade of the pixels including the pixel electrodes 25 that are supplied with image signals via the first source line 27α becomes appropriate and good display quality is obtained. When the high potential Vgh of the second scanning signal G(i+1) is output to the i+1th gate line 26 from the gate driver circuit 15, the image signals are distributed to the first source line 27α, the second source line 27β, and the third source line 27γ similarly as previously described.

As previously described, the liquid crystal display device 10 (the display device) of this embodiment includes the display area AA displaying an image, a non-display area NAA displaying no image, the first source line 27α (the first line) disposed in the display area AA, the second source line 27β (the second line) disposed in the display area AA, the third source line 27γ (the third line) disposed in the display area AA, the connection line 37 disposed in the non-display area NAA and connected to the first source line 27α, the first switching line 38 disposed in the non-display area NAA, the first switching TFT 40 (the first switching component) disposed in the non-display area NAA and including the first gate electrode 40A connected to the first switching line 38, the first source electrode 40B connected to the first source line 27α, and the first drain electrode 40C connected to the second source line 27β, the second switching line 39 disposed in the non-display area NAA, the second switching TFT 41 (the second switching component) disposed in the non-display area NAA and including the second gate electrode 41A connected to the second switching line 39, the second source electrode 41B connected to the first source line 27α, and the second drain electrode 41C connected to the third source line 27γ, and the signal supply section SS disposed in the non-display area NAA and connected to the connection line 37, the first switching line 38, and the second switching line 39. The signal supply section SS is configured to supply image signals to the connection line 37 and supply switching signals having a voltage higher than the threshold voltage of the first switching TFT 40 and the second switching TFT 41 to the first switching line 38 and the second switching line 39 at different timings. The first source line 27α is disposed between the second source line 27β and the third source line 27γ.

When a switching signal is supplied to the first switching line 38 from the signal supply section SS, the first switching TFT 40 including the first gate electrode 40A that is connected to the first switching line 38 is driven. At this time, if an image signal is supplied to the connection line 37 from the signal supply section Ss, the image signal is supplied to the first source electrode 40B of the first switching TFT 40 via the first source line 27α and further supplied to the second source line 27β via the first drain electrode 40C. When a switching signal is supplied to the second switching line 39 from the signal supply section SS, the second switching TFT 41 including the second gate electrode 41A that is connected to the second switching line 39 is driven. At this time, if an image signal is supplied to the connection line 37 from the signal supply section SS, the image signal is supplied to the second source electrode 41B of the second switching TFT 41 via the first source line 27α and further supplied to the third source line 27γ via the second drain electrode 41C. If an image signal is supplied to the connection line 37 from the signal supply section SS with no switching signal being supplied to the first switching line 38 and the second switching line 39 from the signal supply section SS, the image signal is supplied to the first source line 27α from the connection line 37. Thus, by controlling driving of the first switching TFT 40 and the second switching TFT 41, an image signal can be supplied to each of the first source line 27α, the second source line 27β, and the third source line 27γ. With such a configuration, the number of switching TFTs 40, 41 can be reduced compared to a configuration in which switching TFTs are connected to the first source line 27α, the second source line 27β, and the third source line 27γ, respectively. This is preferable to decrease the frame width and improve ability of the first switching TFT 40 and the second switching TFT 41 by increasing the size of the switching TFTs.

With the first source line 27α that is connected to the connection line 37 being disposed between the second source line 27β and the third source line 27γ, the first source line 27α can be easily connected to the first switching TFT 40 and the second switching TFT 41. Accordingly, the parasitic capacitance that may be caused between the first source line 27α and other lines can be reduced and the load on the first source line 27α can be reduced. With the load on the first source line 27α being reduced, delay is less likely to be caused on the image signal that is transferred and this preferably improves display quality.

The liquid crystal display device 10 includes the liquid crystal panel 11 (the display panel) having the plate surface 11S including the display area AA and the non-display area NAA. The liquid crystal panel 11 includes the first source line 27α, the second source line 27β, the third source line 27γ, the connection line 37, the first switching line 38, the second switching line 39, the first switching TFT 40, and the second switching TFT 41. The signal supply section SS at least includes the driver 12 (the first signal supply section) that is included in the liquid crystal panel 11 and connected to the connection line 37 and configured to supply image signals to the connection line 37. The first source line 27α, the second source line 27β, and the third source line 27γ extend along the first direction. The driver 12, the first switching TFT 40, and the second switching TFT 41 are disposed such that the display area AA is between the driver 12 and the switching TFTs 40, 41 with respect to the first direction. The first source line 27α is connected to the first source electrode 40B and the second source electrode 41B. The image signal supplied to the connection line 37 from the driver 12 is supplied to the first source electrode 40B of the first switching TFT 40 and the second source electrode 41B of the second switching TFT 41 via the first source line 27α. The first switching TFT 40 and the second switching TFT 41 are disposed on an opposite side from the driver 12 with respect to the first direction in the liquid crystal panel 11. With such a configuration, the frame width of the liquid crystal panel 11 can be preferably reduced compared to a configuration in which the first switching TFT 40 and the second switching TFT 41 are disposed on the same side as the driver 12 with respect to the first direction in the liquid crystal panel 11.

The first switching line 38 and the second switching line 39 are disposed such that the first switching TFT 40 and the second switching TFT 41 are disposed between the display area AA and each of the first switching line 38 and the second switching line 39 with respect to the first direction. The first switching line 38 and the second switching line 39 are disposed on an opposite side in the first direction from the display area AA with respect to the first switching TFT 40 including the first source electrode 40B that is connected to the first source line 27α and the second switching TFT 41 including the second source electrode 41B that is connected to the first source line 27α. With such a configuration, the first source line 27α does not cross the first switching line 38 and the second switching line 39. Accordingly, the parasitic capacitance that may be caused between the first source line 27α and each of the first switching line 38 and the second switching line 39 can be reduced and the load on the first source line 27α can be reduced.

The first switching TFT 40 and the second switching TFT 41 are disposed to sandwich the first source line 27α between the first switching TFT 40 and the second switching TFT 41 with respect to the second direction crossing the first direction. With the first source line 27α being disposed between the first switching TFT 40 and the second switching TFT 41 with respect to the second direction, the first source line 27α can be easily connected to the first switching TFT 40 and the second switching TFT 41.

The first source line 27α includes the first line portion 27Aα that is a portion of the second metal film (the first conductive film) and the second line portion 27Bα that is a portion of the third metal film (the second conductive film) disposed on an upper layer side of the second metal film via the first interlayer insulating film 34 (the first insulating film). The second line portion 27Bα overlaps the first line portion 27Aα. The first line portion 27Aα and the second line portion 27Bα are connected via the first contact hole CHS1 formed in the first interlayer insulating film 34. With such a configuration, the resistance of the first source line 27α can be reduced compared to a configuration in which the first source line 27α includes only one of the first line portion 27Aα or the second line portion 27Bα. Accordingly, delay is less likely to be caused on the image signal that is transferred via the first source line 27α. Particularly, since the second source line 27β and the third source line 27γ are supplied with image signals via the first source line 27α, delay is also less likely to be caused on the image signals that are transferred via the second source line 27β and the third source line 27γ.

The second source line 27β includes the third line portion 27Aβ and the fourth line portion 27Bβ. The third line portion 27Aβ is a portion of the second metal film that is different from the portion of the second metal film configured as the first line portion 27Aα. The fourth line portion 27Bβ is a portion of the third metal film that is different from the portion of the third metal film configured as the second line portion 27Bα. The third line portion 27Aβ and the fourth line portion 27Bβ overlap. The third source line 27γ includes the fifth line portion 27Aγ and the sixth line portion 27Bγ. The fifth line portion 27Aγ is a portion of the second metal film that is different from the portions of the second metal film configured as the first line portion 27Aα and the third line portion 27Aβ. The sixth line portion 27Bγ is a portion of the third metal that is different from the portions of the third metal configured as the second line portion 27Bα and the fourth line portion 27Bβ. The sixth line portion 27Bγ overlaps the fifth line portion 27Aγ. The third line portion 27Aβ and the fourth line portion 27Bβ are connected via the second contact hole CHS2 that is formed in the first interlayer insulating film 34. The fifth line portion 27Aγ and the sixth line portion 27Bγ are connected via the third contact hole CHS3 formed in the first interlayer insulating film 34. With such a configuration, the resistance of the second source line 27 can be reduced compared to a configuration in which the second source line 27β includes only one of the third line portion 27Aβ or the fourth line portion 27Bβ. Accordingly, delay is less likely to be caused on the image signal that is transferred via the second source line 27β. Furthermore, the resistance of the third source line 27γ can be reduced compared to a configuration in which the third source line 27γ includes only one of the fifth line portion 27Aγ or the sixth line portion 27Bγ. Accordingly, delay is less likely to be caused on the image signal that is transferred via the third source line 27γ.

The signal supply section SS is configured to supply a switching signal to the first switching line 38 with supplying an image signal to the connection line 37 and supply a switching signal to the second switching line 39 with supplying an image signal to the connection line 37 and thereafter, supply an image signal to the connection line 37 without supplying a switching signal to the first switching line 38 and the second switching line 39. When a switching signal is supplied to the first switching line 38 with an image signal being supplied to the connection line 37 from the signal supply section SS, the first switching TFT 40 is driven and the image signal is supplied to the second source line 27β. The image signal is also supplied to the first source line 27α. When a switching signal is supplied to the first switching line 39 with an image signal being supplied to the connection line 37 from the signal supply section SS, the second switching TFT 41 is driven and the image signal is supplied to the third source line 27γ. The image signal is also supplied to the first source line 27α. Thereafter, the signal supply section SS supplies an image signal to the connection line 37 without supplying a switching signal to the first switching line 38 and the second switching line 39. The image signal is not supplied to the second source line 27β and the third source line 27γ but supplied to the first source line 27α. Thus, even if the image signal to be supplied to the second source line 27 and the third source line 27γ is also supplied to the first source line 27α, the image signal that is to be supplied to the first source line 27α is supplied only to the first source line 27α thereafter. Therefore, good display can be obtained.

The liquid crystal display device 10 includes the liquid crystal panel 11 that includes the first source line 27α, the second source line 27β, the third source line 27γ, the connection line 37, the switching line 38, the second switching line 39, the first switching TFT 40, and the second switching TFT 41 and the flexible substrate 13 that is connected to the liquid crystal panel 11. The signal supply section SS includes the driver 12 included in the liquid crystal panel 11 and the control board 14 (the second signal supply section) connected to the flexible substrate 13. The driver 12 is configured to supply image signals to the connection line 37 and the control board 14 is configured to supply switching signals to the first switching line 38 and the second switching line 39 via the flexible substrate 13 at different timings. Thus, the image signal is supplied to the connection line 37 from the driver 12 and the switching signals are supplied to the first switching line 38 and the second switching line 39 at different timings from the control board 14 via the flexible substrate 13. Compared to a configuration in which both of the image signals and the switching signals are supplied from the driver 12, the functions necessary for the driver 12 become low and the driver 12 can be downsized. With the driver 12 that is disposed in the non-display area NAA of the liquid crystal panel 11 being downsized, the frame width of the liquid crystal panel 11 is preferably reduced.

Second Embodiment

A second embodiment will be described with reference to FIGS. 8 and 9. The second embodiment differs from the first embodiment in an outline shape of a liquid crystal panel 111 and a configuration of a first switching circuit 116. Configuration, operations, and effects similar to those of the first embodiment may not be described.

Figure 8:
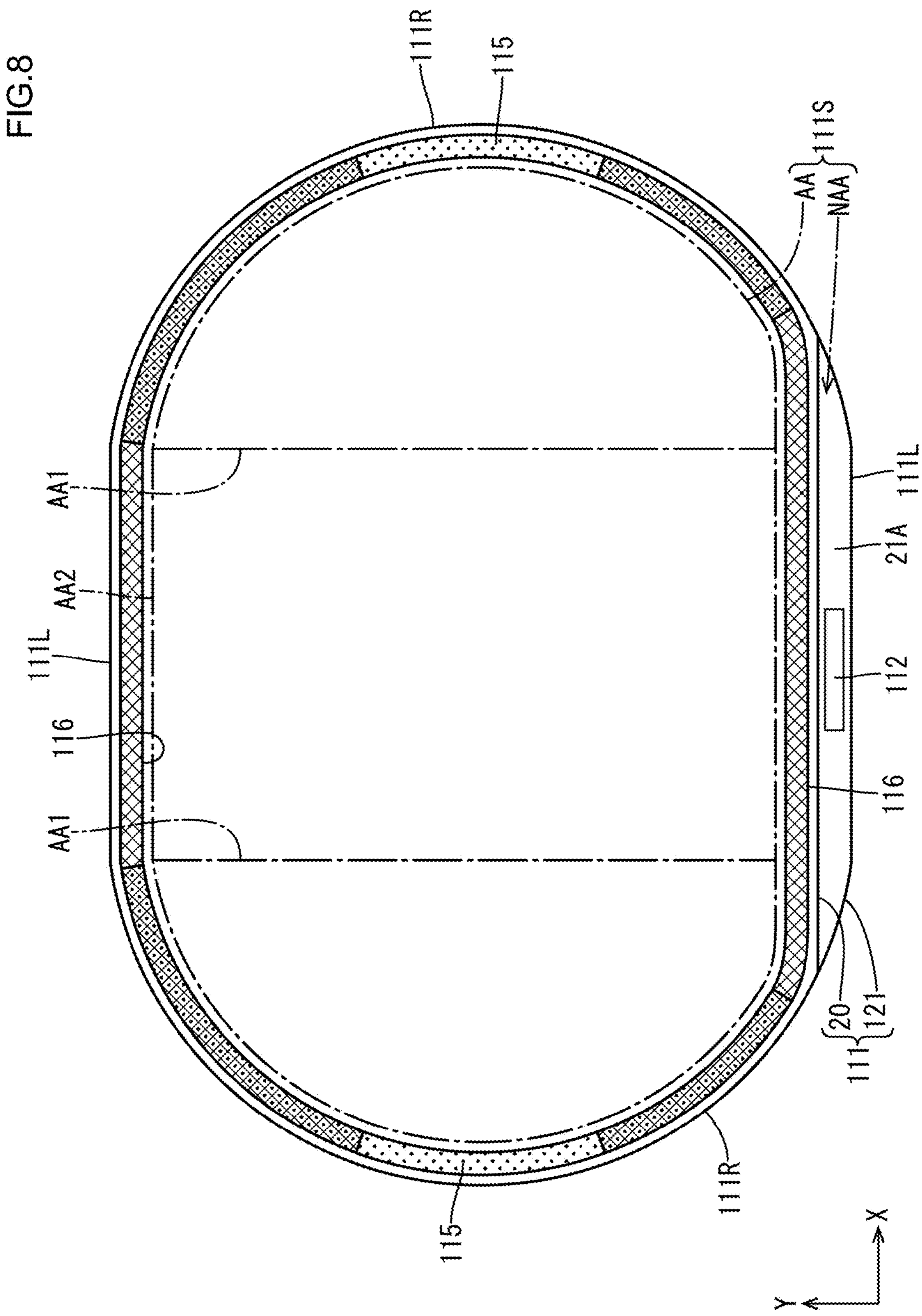
FIG. 8 is a plan view of a liquid crystal panel and a driver according to a second embodiment.

As illustrated in FIG. 8, the liquid crystal panel 111 according to this embodiment does not have a rectangular plan view shape but has a laterally long oval shape. Areas in which gate driver circuits 115 and the first switching circuit 116 are disposed are illustrated with different types of shadings in FIG. 8. The outer edge portion of the liquid crystal panel 111 includes two straight portions 111L and two arched portions 111R (curved portions). The straight portions 111L have a straight linear plan view shape extending along the X-axis direction. The arched portions 111R have an arched plan view shape (a curved shape). The non-display area NAA of an array substrate 121 includes a first side portion on which a driver 112 is mounted and a second side portion that is on opposite side from the first side portion with respect to the Y-axis direction. Each of the first side portion and the second side portion includes the straight portion 111L. The non-display area NAA of the array substrate 121 further includes two third side portions on which two gate driver circuits 115 are mounted, respectively. The third side portions include the arched portions 111R, respectively. The display area AA has a plan view shape that is close to the outline shape of the liquid crystal panel 111. The display area AA includes first areas AA1 and a second area AA2. The first area AA1 has an outline shape including an arched shape similar to the outline shape of the arched portion 111R. The second area AA2 has an outline shape including a straight shape similar to the outline shape of the straight portion 111L. The display area AA includes two first areas AA1 that sandwich the second area AA2 from two sides with respect to the X-axis direction. The first area AA1 has an X-axis dimension that changes as the first area AA1 extends in the Y-axis direction. Namely, the X-axis dimension of the first area AA1 changes according to the positions with respect to the Y-axis direction. Specifically, the first area AA1 has a smallest X-axis dimension in two end portions with respect to the Y-axis direction and has a largest X-axis dimension in a middle with respect to the Y-axis direction. The second area AA2 is next to and spaced from the driver 112 with respect to the Y-axis direction. The second area AA2 has an X-axis dimension that does not change at any positions with respect to the Y-axis direction. Namely, the second area AA2 has a rectangular plan view shape.

As illustrated in FIG. 8, the gate driver circuit 115 has an arched (curved) belt shape extending along the arched portion 111R of the outer edge portion of the liquid crystal panel 111. The gate driver circuit 115 is disposed between the arched portion 111R and the first area AA1 of the display area AA. The first switching circuit 116 includes a middle portion with respect to the X-axis direction and the middle portion of the first switching circuit 116 has a belt shape that extends straight along the straight portion 111L of the outer edge portion of the liquid crystal panel 111. The first switching circuit 116 includes two end portions with respect to the X-axis direction. The two end portions of the first switching circuit 116 have an arched (curved) belt shape that extends along the arched portion 111R of the outer edge portion of the liquid crystal panel 111. The end portions of the first switching circuit 116 are adjacent to end portions of the gate driver circuits 115 with respect to the elongated direction of the gate driver circuits 115. The portion of the gate driver circuit 115 and the portion of the first switching circuit 116 that are adjacent to each other are illustrated with a different type of shading obtained by overlapping the shadings of the driver circuit 115 and the first switching circuit 116.

Figure 9:
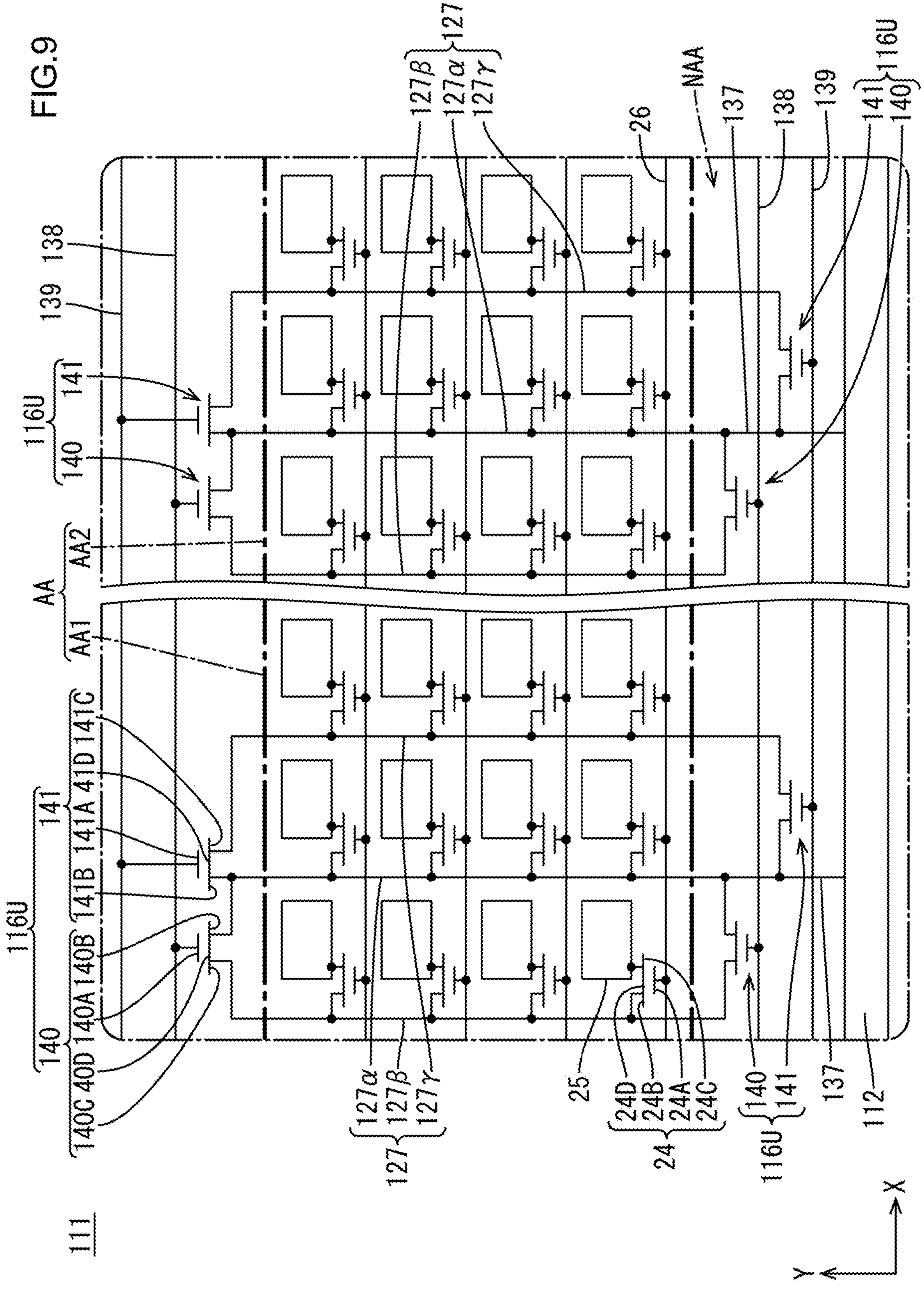
FIG. 9 is a circuit diagram illustrating an electrical configuration of the liquid crystal panel according to the second embodiment.

In this embodiment, as illustrated in FIGS. 8 and 9, two first switching circuits 116 are disposed to sandwich the display area AA with respect to the Y-axis direction. One of the two first switching circuits 116 is disposed on the driver 112 side with respect to the display area AA in the Y-axis direction and is defined as a one-side first switching circuit 116. The other one of the two first switching circuits 116 is disposed on the opposite side from the driver 112 with respect to the display area AA in the Y-axis direction and is defined as an other-side first switching circuit 116. First source lines 127α, second source lines 127β, and third source lines 127γ that are disposed in the first area AA1 of the display area AA are connected to the one-side first switching circuit 116 and the other-side first switching circuit 116. Similarly, the first source lines 127α, the second source lines 127β, and the third source lines 127γ that are disposed in the second area AA2 are connected to the one-side first switching circuit 116 and the other-side first switching circuit 116. Each of a first switching line 138 and a second switching line 139 includes a portion extending along the X-axis direction to cross the one-side first switching circuit 116 and a portion extending along the X-axis direction to cross the other-side first switching circuit 116. In FIG. 9, the configuration of the first area AA1 of the display area AA is illustrated on a left side and the configuration of the second area AA2 is illustrated on a right side.

As illustrated in FIG. 9, a one-side first switching TFT 140 and a one-side second switching TFT 141 included in a one-side unit switching circuit 116U of the one-side switching circuit 116 (a first pair of first and second switching components) are supplied with image signals from a connection line 137. Namely, the connection line 137 is connected to a one-side first source electrode 140B of the one-side first switching TFT 140 and a one-side second source electrode 141B of the one-side second switching TFT 141 that are disposed on the same side as the driver 112 with respect to the display area AA in the Y-axis direction. A one-side first drain electrode 140C of the one-side first switching TFT 140 is connected to a driver 112 side end of the second source line 127β with respect to the Y-axis direction. A one-side second drain electrode 141C of the one-side second switching TFT 141 is connected to a driver 112 side end of the third source line 127γ with respect to the Y-axis direction. A one-side first gate electrode 140A of the one-side first switching TFT 140 is connected to a portion of the first switching line 138 that is on the driver 112 side with respect to the display area AA in the Y-axis direction. A one-side second gate electrode 141A of the one-side second switching TFT 141 is connected to a portion of the second switching line 139 that is on the driver 112 side with respect to the display area AA in the Y-axis direction.

As illustrated in FIG. 9, an other-side first switching TFT 140 and an other-side second switching TFT 141 included in an other-side unit switching circuit 116U of the other-side first switching circuit 116 (a second pair of first and second switching components) are supplied with image signals from the first source line 127α. Namely, the first source line 127α is connected to an other-side first source electrode 140B of the other-side first switching TFT 140 and an other-side second source electrode 141B of the other-side second switching TFT 141 that are disposed on the opposite side from the driver 112 with respect to the display area AA in the Y-axis direction. An other-side first drain electrode 140C of the other-side first switching TFT 140 is connected to an end of the second source line 127β that is an opposite end from the driver 112 side end with respect to the Y-axis direction. An other-side second drain electrode 141C of the other-side second switching TFT 141 is connected to an end of the third source line 127γ that is an opposite end from the driver 112 side end with respect to the Y-axis direction. An other-side first gate electrode 140A of the other-side first switching TFT 140 is connected to a portion of the first switching line 138 that is on an opposite side from the driver 112 with respect to the display area AA in the Y-axis direction. An other-side second gate electrode 141A of the other-side second switching TFT 141 is connected to a portion of the second switching line 139 that is on an opposite side from the driver 112 with respect to the display area AA in the Y-axis direction.

The image signals supplied to the connection line 137 from the driver 112 are directly supplied to the one-side first source electrode 140B of the one-side first switching TFT 140 and the one-side second source electrode 141B of the one-side second switching TFT 141. The image signals supplied to the connection line 137 from the driver 112 are supplied to other-side first source electrode 140B of the other-side first switching TFT 140 and the other-side second source electrode 141B of the other-side second switching TFT 141 via the first source line 127α. The one-side first switching TFT 140 and the other-side first switching TFT 140 are driven at the same timing in response to the first switching signal SW1 (refer to FIG. 7) that is supplied to the first switching line 138. Therefore, the same image signal is supplied to the second source line 127β from the driver 112 side end and the opposite end with respect to the Y-axis direction. The one-side second switching TFT 141 and the other-side second switching TFT 141 are driven at the same timing in response to the second switching signal SW2 (refer to FIG. 7) that is supplied to the second switching line 139. Therefore, the same image signal is supplied to the third source line 127γ from the driver 112 side end and the opposite end with respect to the Y-axis direction. The image signals supplied to the second source line 127β and the third source line 127γ via the one-side first switching TFT 140 and the one-side second switching TFT 141 are not transmitted through the first source line 127α. Therefore, delay is less likely to caused compared to the image signals supplied to the second source line 127β and the third source line 127γ via the other-side first switching TFT 140 and the other-side second switching TFT 141. Therefore, image signals that cause less delay can be supplied to the second source line 127β and the third source line 127γ and display quality is improved.

As previously described, a pair of the first switching TFT 140 and the second switching TFT 141 is disposed on each side with respect to the display area AA in the Y-axis direction. Namely, two pairs of the first switching TFT 140 and the second switching TFT 141 are disposed to sandwich the display area AA with respect to the Y-axis direction. With such a configuration, each of the first switching TFT 140 and the second switching TFT 141 can be downsized compared to the configuration of the first embodiment that includes the first switching TFT 40 and the second switching TFT 41 only on one side with respect to the display area AA in the Y-axis direction. Accordingly, the arrangement space for each of the first switching TFTs 140 and the second switching TFTs 141 can become smaller and this is preferable for reducing the frame width of the liquid crystal panel 111. Particularly in the configuration of this embodiment in which the display area AA includes the first area AA1 and the gate driver circuit 115 and the first switching circuit 116 have portions that are adjacent to each other, it is difficult to keep spaces for the gate driver circuit 115 and the first switching circuit 116. In this respect, with the arrangement space for each of the first switching TFTs 140 and the second switching TFTs 141 becoming smaller, the frame width in the portions of the gate driver circuit 115 and the first switching circuit 116 that are adjacent to each other is less likely to be increased and the frame width is effectively reduced.

As previously described, this embodiment includes the liquid crystal panel 111 that has a plate surface 111S including the display area AA and the non-display area NAA. The liquid crystal panel 111 includes the first source line 127α, the second source line 127β, the third source line 127γ, the connection line 137, the first switching line 138, the second switching line 139, the first switching TFT 140, and the second switching TFT 141. The signal supply section SS at least includes the driver 112 that is included in the liquid crystal panel 11, connected to the connection line 137, and configured to supply an image signal to the connection line 137. The first source line 127α, the second source line 127β, and the third source line 127γ extend along the first direction. A pair of the first switching TFT 140 and the second switching TFT 141 is disposed on each side with respect to the display area AA of the liquid crystal panel 111 in the first direction. Two pairs of the first switching TFT 140 and the second switching TFT 141 are disposed to sandwich the display area AA of the liquid crystal panel 111 with respect to the first direction. The driver 112 is disposed on a side edge portion of the liquid crystal panel 111 including the one-side first switching TFT 140 and the one-side second switching TFT 141 with respect to the display area AA in the first direction. The connection line 137 is connected to the one-side first source electrode 140B of the one-side first switching TFT 140 and the one-side second source electrode 141B of the one-side second switching TFT 141 that are disposed on the driver 112 side with respect to the display area AA in the first direction. The first source line 127α is connected to the other-side first source electrode 140B of the other first switching TFT 140 and the other-side second source electrode 141B of the other second switching TFT 141 that are disposed on the opposite side from the driver 112 with respect to the display area AA in the first direction. The image signal supplied to the connection line 137 from the driver 112 is supplied to the one-side first source electrode 140B of the one-side first switching TFT 140 and the one-side second source electrode 141B of the one-side second switching TFT 141 that are disposed on the same side as the driver 112 with respect to the display area AA in the first direction. The image signal supplied to the connection line 137 from the driver 112 is supplied via the first source line 127α to the other-side first source electrode 140B of the other-side first switching TFT 140 and the other-side second source electrode 141B of the other-side second switching TFT 141 that are disposed on the opposite side from the driver 112 with respect to the display area AA in the first direction. Thus, the first switching TFT 140 and the second switching TFT 141 are disposed on each side with respect to the display area AA in the Y-axis direction. Namely, the two pairs of the first switching TFT 140 and the second switching TFT 141 are disposed to sandwich the display area AA with respect to the Y-axis direction. With such a configuration, each of the first switching TFT 140 and the second switching TFT 141 can be downsized compared to the configuration that includes the first switching TFT 140 and the second switching TFT 141 only on one side with respect to the display area AA in the Y-axis direction. Accordingly, the arrangement space for each of the first switching TFTs 140 and the second switching TFTs 141 can become smaller and this is preferable for reducing the frame width of the liquid crystal panel 111.

Third Embodiment

A third embodiment will be described with reference to FIG. 10. The third embodiment differs from the second embodiment in a configuration of a first switching circuit 216. Configuration, operations, and effects similar to those of the second embodiment may not be described.

Figure 10:
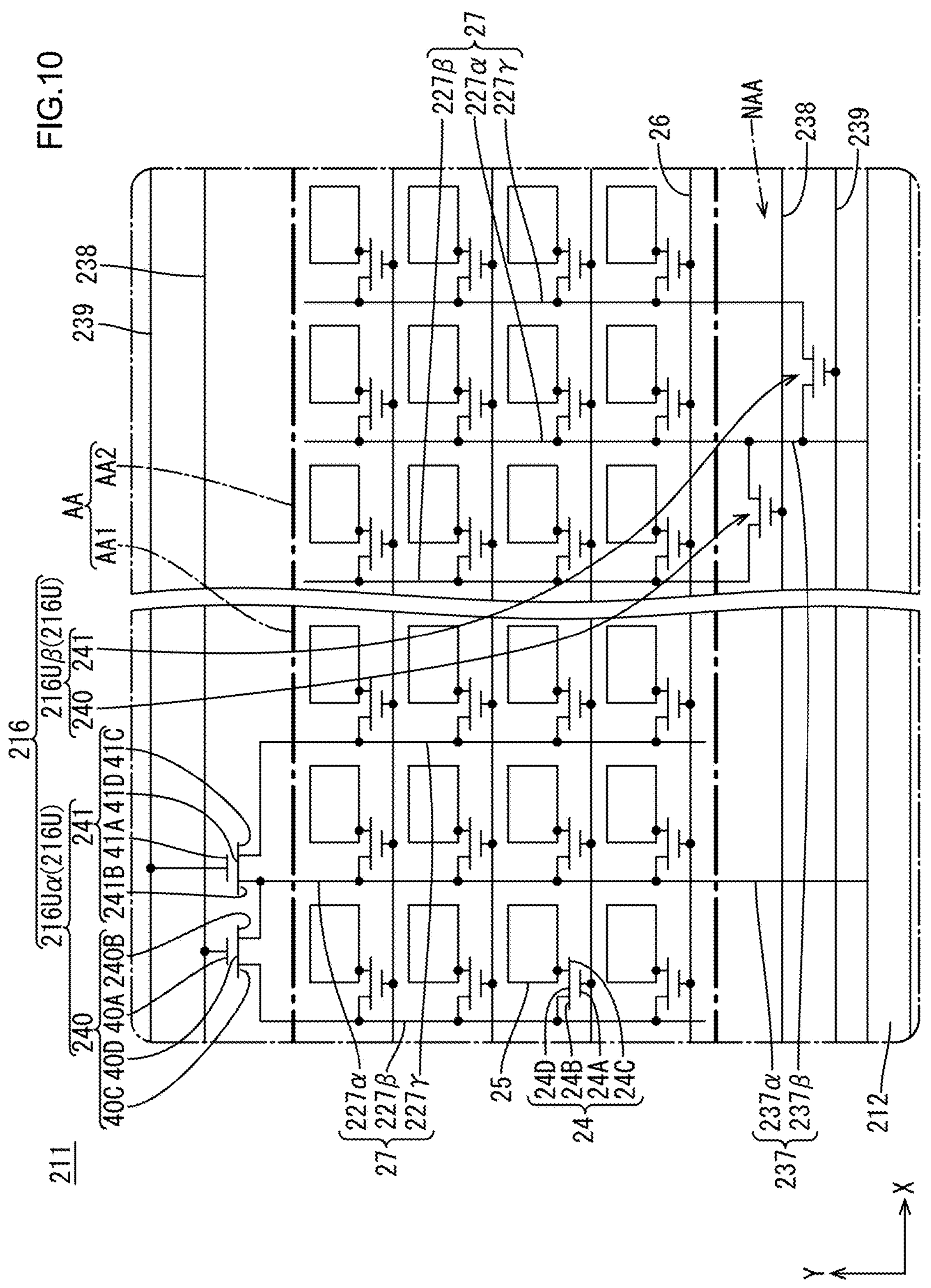
FIG. 10 is a circuit diagram illustrating an electrical configuration of a liquid crystal panel according to a third embodiment.

As illustrated in FIG. 10, the first switching circuit 216 of this embodiment includes a first unit switching circuit 216Uα and a second unit switching circuit 126Uβ. Each of the first unit switching circuit 216Uα and the second unit switching circuit 126Uβ includes a first switching TFT 240 and a second switching TFT 241. The first unit switching circuit 216Uα is disposed on an opposite side from a driver 212 with respect to the first area AA1 of the display area AA in the Y-axis direction. The second unit switching circuit 126Uβ is disposed on the same side as the driver 212 with respect to the second area AA2 of the display area AA in the Y-axis direction. Namely, in this embodiment, no unit switching circuit 126U is disposed on the driver 212 side with respect to the first area AA1 in the Y-axis direction and no unit switching circuit 216U is disposed on the opposite side from the driver 212 with respect to the second area AA2 in the Y-axis direction.

This embodiment includes connection lines 237 including a first connection line 237α and a second connection line 237β. The first connection line 237α is connected to a first source line 227α that is disposed in the first area AA1 of the display area AA. The second connection line 237β is connected to the first source line 227α that is disposed in the second area AA2.

The first switching TFT 240 and the second switching TFT 241 of the first unit switching circuit 216Uα respectively includes a first source electrode 240B and a second source electrode 241B that are connected to the first source line 227α and the first source line 227α is connected to the first connection line 237α. Therefore, the image signal supplied to the first connection line 237α from the driver 212 is supplied to the first source line 227α disposed in the first area AA1 and also supplied to the first source electrode 240B of the first switching TFT 240 and the second source electrode 241B of the second switching TFT 241 via the first source line 227α disposed in the first area AA1.

The first switching TFT 240 and the second switching TFT 241 of the second unit switching circuit 216Uβ respectively includes the first source electrode 240B and the second source electrode 241B that are connected to the second connection line 237β. Therefore, the image signal supplied to the second connection line 237β from the driver 212 is supplied to the first source electrode 240B of the first switching TFT 240 and the second source electrode 241B of the second switching TFT 241 and also supplied to the first source line 227α disposed in the second area AA2.

It is difficult to keep a space for the lines in a portion of the non-display area NAA of a liquid crystal panel 211 adjacent to the first area AA1 (specifically, a portion that is between the arched outline of the first area AA1 and the arched portions 111R, refer to FIG. 8). Particularly in the configuration in which the display area AA includes the first area AA1 and the gate driver circuit 115 and the first switching circuit 216 have portions that are adjacent to each other, it is difficult to keep spaces for the gate driver circuit 115 and the first switching circuit 216 (refer to FIG. 8). In this respect, in this embodiment, the driver 212 and the first unit switching circuit 216Uα are disposed away from each other to sandwich the first area AA1 with respect to the Y-axis direction in the liquid crystal panel 211. With such a configuration, a space e for arranging the lines (including the gate driver circuit 15) can be provided in a portion of the non-display area NAA of the liquid crystal panel 211 near the first area AA1 and a frame width of the portion of the non-display area NAA near the first area AA1 can be reduced compared to a configuration in which the first unit switching circuit 216Uα is disposed on the same side as the driver 212 in the Y-axis direction.

As previously described, this embodiment includes the liquid crystal panel 211 having the plate surface 11S that includes the display area AA and the non-display area NAA, and the first switching circuit 216 including the unit switching circuits 216U, the first switching line 238, and the second switching line 239. The unit switching circuit 216U includes the first switching TFT 240 and the second switching TFT 241. The liquid crystal panel 211 includes the first source line 227α, the second source line 227β, the third source line 227γ, the connection line 237, and the first switching circuit 216. The signal supply section SS at least includes the driver 212 that is included in the liquid crystal panel 211, connected to the connection line 237, and configured to supply an image signal to the connection line 237. The first source line 227α, the second source line 227β, and the third source line 227γ extend along the first direction. The display area AA includes the first area AA1 and the second area AA2. The first area AA1 has an outer dimension measured in the second direction that crosses the first direction and the outer dimension of the first area AA1 changes according the positions with respect to the first direction. The second area AA2 has an outer dimension measured in the second direction and the outer dimension of the second area AA2 is same at any positions with respect to the first direction. The first source line 227α, the second source line 227β, and the third source line 227γ are disposed in each of the first area AA1 and the second area AA2. The connection lines 237 include the first connection line 237α that is connected to the first source line 227α disposed in the first area AA1 and the second connection line 237β that is connected to the first source line 227α disposed in the second area AA2. The driver 212 is disposed in the liquid crystal panel 211 on one side with respect to the display area AA in the first direction. The unit switching circuits 216U include the first unit switching circuit 216Uα and the second unit switching circuit 216Uβ. The first unit switching circuit 216Uα includes the first switching TFT 240 and the second switching TFT 241 that respectively include the first source electrode 240B and the second source electrode 241B that are connected to the first source line 227α connected to the first connection line 237α. The second unit switching circuit 216Uβ includes the first switching TFT 240 and the second switching TFT 241 that respectively include the first source electrode 240B and the second source electrode 241B that are connected to the second connection line 237β. The first unit switching circuit 216Uα is disposed on an opposite side from the driver 212 with respect to the first direction in the liquid crystal panel 211. The second unit switching circuit 216Uβ is disposed on the same side as the driver 212 with respect to the first direction in the liquid crystal panel 211. Thus, the first unit switching circuit 216Uα is disposed on the opposite side from the driver 212 with respect to the first direction in the liquid crystal panel 211 and the first source electrode 240B and the second source electrode 241B of the first switching TFT 240 and the second switching TFT 241 included in the first unit switching circuit 216Uα are connected to the first source line 227α disposed in the first area AA1. Therefore, the image signal supplied to the first connection line 237α from the driver 212 is supplied via the first source line 227α disposed in the first area AA1 to the first source electrode 240B and the second source electrode 241B of the first switching TFT 240 and the second switching TFT 241 included in the first unit switching circuit 216Uα. On the other hand, the second unit switching circuit 216Uβ is disposed on the same side as the driver 212 with respect to the first direction in the liquid crystal panel 211 and the first source electrode 240B and the second source electrode 241B of the first switching TFT 240 and the second switching TFT 241 included in the second unit switching circuit 216Uβ are connected to the second connection line 237β. Therefore, the image signal supplied to the second connection line 237β from the driver 212 is supplied to the first source line 227α disposed in the second area AA2 and further supplied to the first source electrode 240B and the second source electrode 241B of the first switching TFT 240 and the second switching TFT 241 included in the second unit switching circuit 216Uβ. It is difficult to keep a space for the lines in a portion of the non-display area NAA of a liquid crystal panel 211 adjacent to the first area AA1. In this respect, the driver 212 and the first unit switching circuit 216Uα are disposed away from each other to sandwich the first area AA1 with respect to the Y-axis direction in the liquid crystal panel 211. With such a configuration, a space for arranging the lines can be provided in the portion of the non-display area NAA of the liquid crystal panel 211 that is adjacent to the first area AA1 and a frame width of the portion of the non-display area NAA can be reduced compared to a configuration in which the first unit switching circuit 216Uα is disposed on the same side as the driver 212 in the liquid crystal panel 211 with respect to the first direction.

Fourth Embodiment

A fourth embodiment will be described with reference to FIGS. 11 and 12. The fourth embodiment differs from the second embodiment in a configuration of a first switching circuit 316 and further includes a second switching circuit 42. Configuration, operations, and effects similar to those of the second embodiment may not be described.

Figure 11:
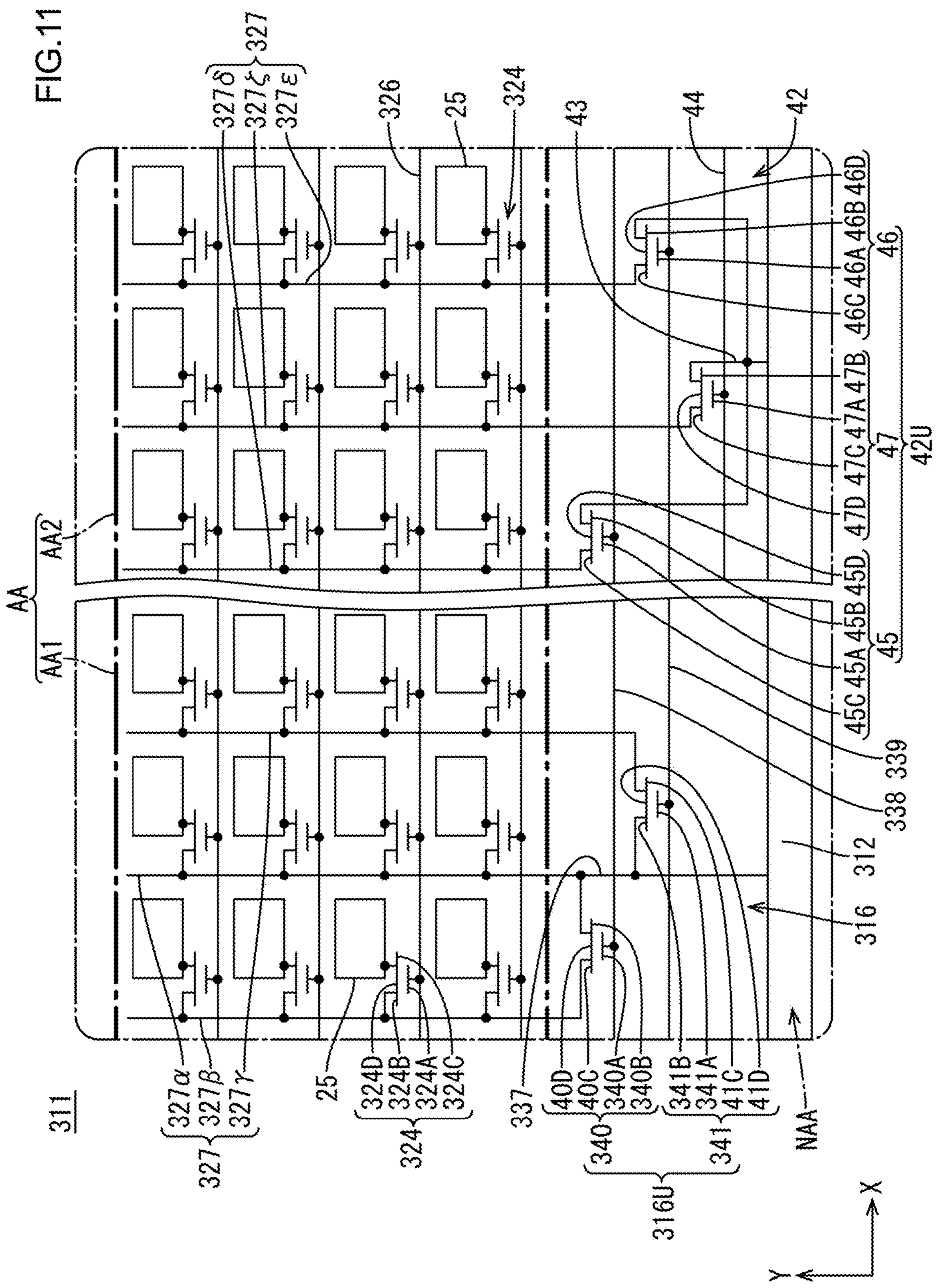
FIG. 11 is a circuit diagram illustrating an electrical configuration of a liquid crystal panel according to a fourth embodiment.
Figure 12:
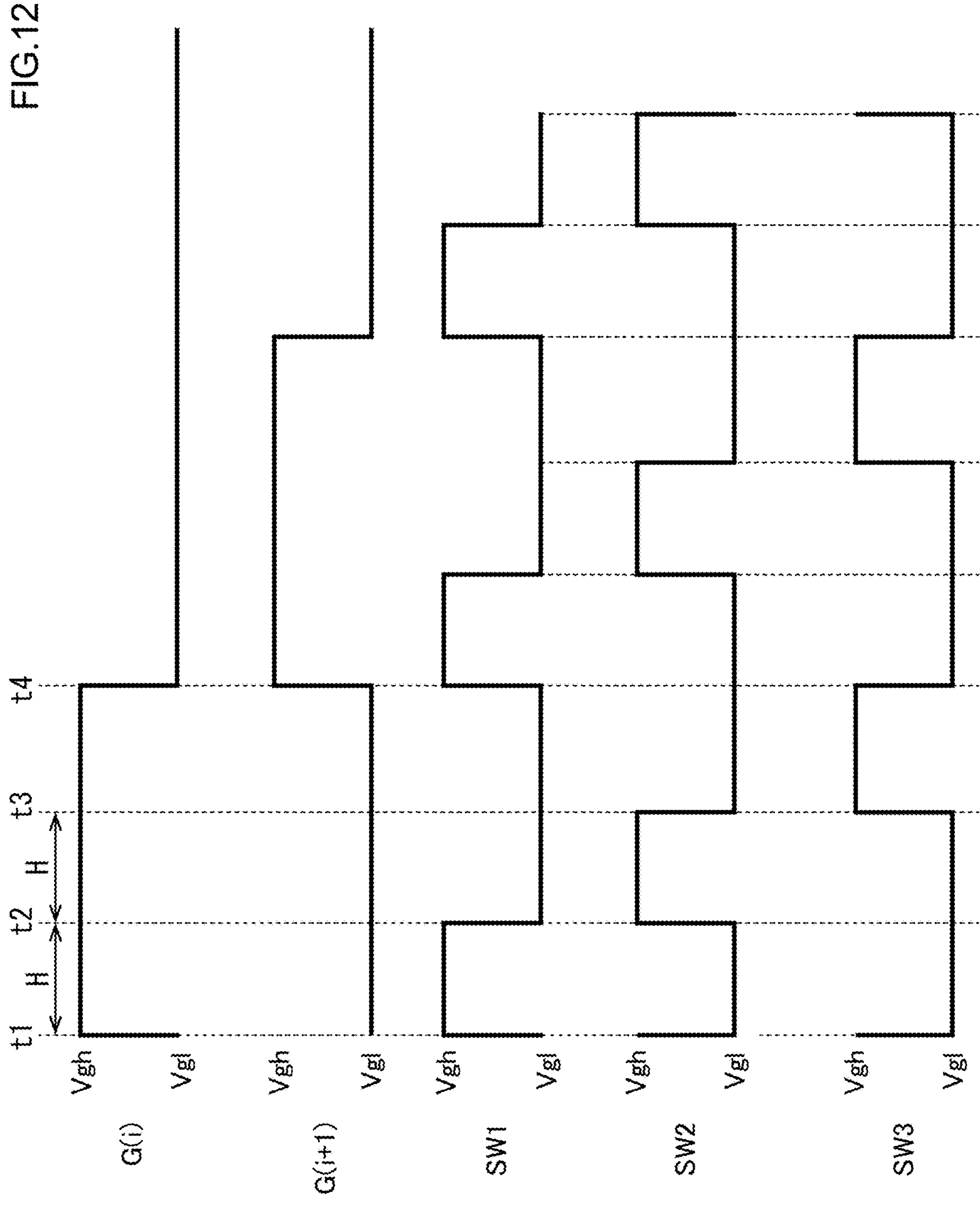
FIG. 12 is a timing chart related to operations of a gate driver circuit and a first switching circuit according to the fourth embodiment.

As illustrated in FIG. 11, the first switching circuit 316 of this embodiment includes a unit switching circuit 316U that is disposed on a same side as a driver 312 with respect to the first area AA1 of the display area AA in the Y-axis direction. The unit switching circuit 316U includes a first switching TFT 340 and a second switching TFT 341. The first switching TFT 340 and the second switching TFT 341 respectively include a first source electrode 340B and a second source electrode 341B that are connected to a connection line 337. Therefore, the image signal supplied to the connection line 337 from the driver 312 is supplied to the first source electrode 340B and the second source electrode 341B of the first switching TFT 340 and the second switching TFT 341 and also supplied to the first source line 327α disposed in the first area AA1. The number of connection lines 337 is about one third of the number of source lines 327 disposed in the first area AA1.

As illustrated in FIG. 11, a liquid crystal panel 311 of this embodiment includes the second switching circuit 42 and a distribution line 43. The second switching circuit 42 is disposed on the same side as the driver 312 with respect to the second area AA2 in the Y-axis direction. The distribution line 43 is connected to the second switching circuit 42 and the driver 312. The frame shaped non-display area NAA of the liquid crystal panel 311 includes four side portions and the distribution line 43 is disposed on one of the four side portions close to the driver 312 and extends from the mount area in which the driver 312 is mounted to the second switching circuit 42. The distribution line 43 is supplied with image signals from the driver 312, which is the signal supply section SS. The number of distribution lines 43 is about one third of the number of source lines 327 disposed in the second area AA2.

As illustrated in FIG. 11, the second switching circuit 42 is disposed on one of the four side portions of the frame shaped non-display area NAA of the liquid crystal panel 311 that is on the same side as the driver 312. The second switching circuit 42 is disposed in a laterally elongated belt area that extends along the X-axis direction. The laterally elongated belt area has an X-axis dimension substantially same as that of the second area AA2. The second switching circuit 42 has a switching function of distributing image signals supplied from the driver 312 to the source lines 327 similar to the first switching circuit 316 and is a so-called SSD circuit.

As illustrated in FIG. 11, the second switching circuit 42 includes unit switching circuits 42U and switching lines including the first switching line 338, the second switching line 339, and a third switching line 44. The unit switching circuits 42U are arranged along the extending direction (the X-axis direction) in which the second switching circuit 42 extends. The number of unit switching circuits 42U is same as the number of distribution lines 43 and is about one third of the number of source lines 327 disposed in the second area AA2. The second switching circuit 42 includes the third switching line 44 in addition to the first switching line 338 and the second switching line 339 (similar to the first and second switching lines 38, 39 of the first embodiment). Namely, the first switching line 338 and the second switching line 339 are commonly included in the first switching circuit 316 and the second switching circuit 42. In the following, the third switching line 44 will be described. The third switching line 44 extends along the X-axis direction in the area in which the unit switching circuits 42U are arranged. The third switching line 44 extends outside the area in which the unit switching circuits 42U are disposed in the non-display area NAA and is connected to the flexible substrate 13 (refer to FIG. 1). The third switching line 44 is supplied with switching signals from the control board 14, which is the signal supply section SS, via the flexible substrate 13 (refer to FIG. 1). The control board 14 is configured to output the switching signal to the third switching line 44 at a timing different from the timing of outputting switching signals to the first switching line 338 and the second switching line 339. The voltage of the switching signals supplied to the third switching line 44 is higher than the threshold voltage of the first switching TFT 340 and the second switching TFT 341 and the threshold voltage of a third switching TFT 45, a fourth switching TFT 46, and a fifth switching TFT 47, which will be described later.

As illustrated in FIG. 11, the unit switching circuit 42U includes the third switching TFT 45 (a third switching component), the fourth switching TFT 46 (a fourth switching component), and the fifth switching TFT 47 (a fifth switching component). The third switching TFT 45 is connected to the first switching line 338, a predefined one of the source lines 327 (a fourth source line 327δ) disposed in the second area AA2, and the distribution line 43. The fourth switching TFT 46 is connected to the second switching line 339, a predefined one of the source lines 327 (a fifth source line 327ε) disposed in the second area AA2, and the distribution line 43. The fifth switching TFT 47 is connected to the third switching line 44, a predefined one of the source lines 327 (a sixth source line 327ζ) disposed in the second area AA2, and the distribution 43. In the following description, one of the source lines 327 disposed in the second area AA2 and connected to the third switching TFT 45 is defined as the fourth source line 327δ (a fourth line). One of the source lines 327 disposed in the second area AA2 and connected to the fourth switching TFT 46 is defined as the fifth source line 327ε (a fifth line). One of the source lines 327 disposed in the second area AA2 and connected to the fifth switching TFT 47 is defined as the sixth source line 327ζ (a sixth line).

As illustrated in FIG. 11, the third switching TFT 45 includes a third gate electrode 45A that is connected to the first switching line 338, a third source electrode 45B that is connected to the distribution line 43, a third drain electrode 45C that is connected to the fourth source line 327δ, and a third semiconductor portion 45D that is connected to the third source electrode 45B and the third drain electrode 45C. The fourth switching TFT 46 includes a fourth gate electrode 46A that is connected to the second switching line 339, a fourth source electrode 46B that is connected to the distribution line 43, a fourth drain electrode 46C that is connected to the fifth source line 327ε, and a fourth semiconductor portion 46D that is connected to the fourth source electrode 46B and the fourth drain electrode 46C. The fifth switching TFT 47 includes a fifth gate electrode 47A that is connected to the third switching line 44, a fifth source electrode 47B that is connected to the distribution line 43, a fifth drain electrode 47C that is connected to the sixth source line 327ζ, and a fifth semiconductor portion 47D that is connected to the fifth source electrode 47B and the fifth drain electrode 47C. The third switching TFT 45, the fourth switching TFT 46, and the fifth switching TFT 47 have a configuration similar to that of a pixel TFT 324, the first switching TFT 340, and the second switching TFT 341 (refer to FIG. 5). Specifically, the third gate electrode 45A, the fourth gate electrode 46A, and the fifth gate electrode 47A are portions of the first metal film portions of which are configured as pixel gate electrodes 324A. The third source electrode 45B, the third drain electrode 45C, the fourth source electrode 46B, the fourth drain electrode 46C, the fifth source electrode 47B, and the fifth drain electrode 47C are portions of the second metal film portions of which are configured as the pixel source electrodes 324B and pixel drain electrodes 324C. The third semiconductor portion 45D, the fourth semiconductor portion 46D, and the fifth semiconductor portion 47D are portions of the semiconductor film portions of which are configured as pixel semiconductor portions 324D. The fourth source line 327δ, the fifth source line 327ε, and the sixth source line 327ζ that are disposed in the second area AA2 extend such that ends on the driver 312 side with respect to the Y-axis direction reach the non-display area NAA and are connected to the third switching TFT 45, the fourth switching TFT 46, and the fifth switching TFT 47, respectively.

Next, the detailed operation of the second switching circuit 42 will be described with reference to FIG. 12. FIG. 12 is a timing chart related to the operation of the second switching circuit 42. FIG. 12 illustrates waveforms of signals transmitted via gate lines 326, the first switching line 338, the second switching line 339, and the third switching line 44. In FIG. 12, each scale mark represents one unit period H (one horizontal period). Specifically, the signal waveforms of a first scanning signal G(i) transmitted via the gate line 326 that is the ith (hereinafter, i represents an integer of 1 or greater) one from the above in FIG. 11, a second scanning signal G(i+1) transmitted via the gate line 326 that is the i+1th one from the above in FIG. 11, a first switching signal SW1 transmitted via the first switching line 338, a second switching signal SW2 transmitted via the second switching line 339, and a third switching signal SW3 transmitted via the third switching line 44 are illustrated in this order from the above in FIG. 12.

The first scanning signal G(i), the second scanning signal G(i+1), the first switching signal SW1, the second switching signal SW2, and the third switching signal SW3 include the high potential Vgh and the low potential Vgl similar to the first embodiment. The first switching signal SW1, the second switching signal SW2, and the third switching signal SW3 have substantially a square signal waveform such that the high potential Vgh for one unit period H and the low potential Vgl for continuous two unit periods H are repeated periodically. The first switching signal SW1 and the second switching signal SW2 are synchronized such that the falling edge timing of the first switching signal SW1 falling from the high potential Vgh to the low potential Vgl matches the rising edge timing of the second switching signal SW2 rising from the low potential Vgl to the high potential Vgh. The second switching signal SW2 and the third switching signal SW3 are synchronized such that the falling edge timing of the second switching signal SW2 falling from the high potential Vgh to the low potential Vgl matches the rising edge timing of the third switching signal SW3 rising from the low potential Vgl to the high potential Vgh. The control board 14, which is the signal supply section SS, applies the high potential Vgh to the first switching line 338. the second switching line 339, and the third switching line 44 at different timings. The first scanning signal G(i) and the second scanning signal G(i+1) are previously described in the first embodiment.

The operation of the second switching circuit 42 will be described more in detail. As illustrated in FIG. 12, when the high potential Vgh of the first scanning signal G(i) is output to the ith gate line 326 from the gate driver circuit 15 (timing t1), the high potential Vgh of the first switching signal SW1 is output to the first switching line 338 from the control board 14. For a period from the timing t1 to the falling edge timing of the first switching signal SW1 falling from the high potential Vgh to the low potential Vgl (timing t2), the third switching TFT 45 is driven. At this time, the first switching TFT 340 of the first switching circuit 316 is also driven. While the third switching TFT 45 is driven, the image signal supplied from the driver 312 to the distribution line 43 is supplied to the fourth source line 327δ via the third source electrode 45B, the third semiconductor portion 45D, and the third drain electrode 45C of the third switching TFT 45. Therefore, the pixel TFT 324 that is connected to the ith gate line 326 and the fourth source line 327δ is driven and the pixel electrode 325 that is connected to the pixel TFT 324, which is connected to the ith gate line 326 and the fourth source line 327δ, is charged at a potential according to the image signal supplied to the fourth source line 327δ.

At the timing t2, the first scanning signal G(i) is maintained at the high potential Vgh and the high potential Vgh of the second switching signal SW2 is output to the second switching line 339 from the control board 14. For a period from the timing t2 to the falling edge timing of the second switching signal SW2 falling from the high potential Vgh to the low potential Vgl (timing t3), the fourth switching TFT 46 is driven. At this time, the second switching TFT 341 of the first switching circuit 316 is also driven. While the fourth switching TFT 46 is driven, the image signal supplied from the driver 312 to the distribution line 43 is supplied to the fifth source line 327ε via the fourth source electrode 46B, the fourth semiconductor portion 46D, and the fourth drain electrode 46C of the fourth switching TFT 46. Therefore, the pixel TFT 324 that is connected to the ith gate line 326 and the fifth source line 327ε is driven and the pixel electrode 325 that is connected to the pixel TFT 324, which is connected to the ith gate line 326 and the fifth source line 327ε, is charged at a potential according to the image signal supplied to the fifth source line 327ε.

At the timing t3, the first scanning signal G(i) is maintained at the high potential Vgh and the high potential Vgh of the third switching signal SW3 is output to the third switching line 44 from the control board 14. For a period from the timing t3 to the falling edge timing of the third switching signal SW3 falling from the high potential Vgh to the low potential Vgl (timing t4), the fifth switching TFT 47 is driven. At this time, the first switching TFT 340 and the second switching TFT 341 of the first switching circuit 316 are not driven. While the fifth switching TFT 47 is driven, the image signal supplied from the driver 312 to the distribution line 43 is supplied to the sixth source line 327ζ via the fifth source electrode 47B, the fifth semiconductor portion 47D, and the fifth drain electrode 47C of the fifth switching TFT 47. Therefore, the pixel TFT 324 that is connected to the ith gate line 326 and the sixth source line 327ζ is driven and the pixel electrode 325 that is connected to the pixel TFT 324, which is connected to the ith gate line 326 and the sixth source line 327ζ, is charged at a potential according to the image signal supplied to the sixth source line 327ζ.

Thus, with the second switching circuit 42, by controlling the driving of the third switching TFT 45, the fourth switching TFT 46, and the fifth switching TFT 47, the image signals supplied to the distribution line 43 from the driver 312 are transmitted to the fourth source line 327δ, the fifth source line 327ε, and the sixth source line 327ζ at different timings. When the high potential Vgh of the second scanning signal G(i+1) is output to the i+1th gate line 326 from the gate driver circuit 15, the image signals are distributed to the fourth source line 327δ, the fifth source line 327ε, and the sixth source line 327ζ similarly to the above.

It is difficult to keep a space for the lines in a portion of the non-display area NAA of the liquid crystal panel 311 adjacent to the e first area AA1. Particularly in the configuration in which the display area AA includes the first area AA1 and the gate driver circuit 115 and the first switching circuit 316 have portions that are adjacent to each other, it is difficult to keep spaces for the gate driver circuit 115 and the first switching circuit 316 (refer to FIG. 8). In this respect, in this embodiment, the first switching TFT 340 and the second switching TFT 341 are connected to the first source line 327α, the second source line 327β, and the third source line 327γ that are disposed in the first area AA1. Therefore, the number of switching TFTs in the portion of the non-display area NAA adjacent to the first area AA1 can be reduced compared to the configuration in which the third switching TFT 45, the fourth switching TFT 46 and the fifth switching TFT 47 are connected to the fourth source line 327β, the fifth source line 327ε, and the sixth source line 327ζ that are disposed in the second area AA2. With such a configuration, a space for arranging the lines can be provided in a portion of the non-display area NAA of the liquid crystal panel 311 that is adjacent to the first area AA1 and a frame width of the portion of the non-display area NAA can be reduced. Furthermore, the first switching line 338 is connected to the first gate electrode 340A of the first switching TFT 340 and the third gate electrode 45A of the third switching TFT 45 and the second switching line 339 is connected to the second gate electrode 341A of the second switching TFT 341 and the fourth gate electrode 46A of the fourth switching TFT 46. With such a configuration, the number of switching lines 44, 338, 339 can be reduced compared to a configuration in which switching lines are connected to the first gate electrode 340A and the third gate electrode 45A, respectively, and switching lines are connected to the second gate electrode 341A and the fourth gate electrode 46A, respectively. This is preferable to decrease a frame width of the portion of the non-display area NAA of the liquid crystal panel 311 adjacent to the first area AA1.

In this embodiment, as illustrated in FIG. 11, the first source line 327α, the second source line 327β, and the third source line 327γ that are disposed in the first area AA1 are shorter than the fourth source line 327δ, the fifth source line 327ε, and the sixth source line 327ζ that are disposed in the second area AA2 due to the configuration as follows. The Y-axis dimension of the first area AA1 that has a non-rectangular plan view shape is shorter than the Y-axis dimension of the second area AA2 that has a rectangular plan view shape (refer to FIG. 8). Since the image signals supplied to the second source line 327β and the third source line 327γ are also supplied to the first source line 327α in the first area AA1, a parasitic capacitance may be caused between the first source line 327α and other lines and signal delay is likely to be caused. In this respect, with the first source line 327α, the second source line 327β, and the third source line 327γ being shorter than the fourth source line 327δ, the fifth source line 327ε, and the sixth source line 327ζ, the resistance of the first source line 327α, the second source line 327β, and the third source line 327γ can be reduced and accordingly, signal delay is less likely to be caused on the image signal supplied to the second source line 327β and the third source line 327γ via the first source line 327α. On the other hand, the fourth source line 327δ, the fifth source line 327ε, and the sixth source line 327ζ are longer than the first source line 327α, the second source line 327β, and the third source line 327γ. The image signal supplied to the fourth source line 327δ is not supplied to the fifth source line 327ε and the sixth source line 327ζ. The image signal supplied to the fifth source line 327ε is not supplied to the fourth source line 327δ and the sixth source line 327ζ. The image signal supplied to the sixth source line 327ζ is not supplied to the fourth source line 327δ and the fifth source line 327ε. Therefore, signal delay is less likely to be caused on any of the above image signals.

As previously described, according to this embodiment, the first source line 327α, the second source line 327β, and the third source line 327γ extend along the first direction. The display area AA includes the first area AA1 and the second area AA2. The first area AA1 has an outer dimension measured in the second direction, which crosses the first direction, and the outer dimension of the first area AA1 changes according the positions with respect to the first direction. The second area AA2 has an outer dimension that is measured in the second direction and is same at any positions with respect to the first direction. The first source line 327α, the second source line 327β, and the third source line 327γ are disposed in the first area AA1. This embodiment further includes the fourth source line 327δ (a fourth line) disposed in the second area AA2, the fifth source line 327ε (a fifth line) disposed in the second area AA2, the sixth source line 327ζ (a sixth line) disposed in the second area AA2, the distribution line 43 disposed in the non-display area NAA and connected to the signal supply section SS, the third switching line 44 disposed in the non-display area NAA, the third switching TFT 45 (a third switching component) disposed in the non-display area NAA, the fourth switching TFT 46 (a fourth switching component) disposed in the non-display area NAA, and the fifth switching TFT 47 (a fifth switching component) disposed in the non-display area NAA. The third switching TFT 45 includes the third gate electrode 45A that is connected to the first switching line 338, the third source electrode 45B that is connected to the distribution line 43, and the third drain electrode 45C that is connected to the fourth source line 327δ. The fourth switching TFT 46 includes the fourth gate electrode 46A that is connected to the second switching line 339, the fourth source electrode 46B that is connected to the distribution line 43, and the fourth drain electrode 46C that is connected to the fifth source line 327ε. The fifth switching TFT 47 includes the fifth gate electrode 47A that is connected to the third switching line 44, the fifth source electrode 47B that is connected to the distribution line 43, and the fifth drain electrode 47C that is connected to the sixth source line 327ζ. When a switching signal is supplied to the first switching line 338 from the signal supply section SS, the third switching TFT 45 including the third gate electrode 45A that is connected to the first switching line 338 is driven. At this time, if an image signal is supplied to the distribution line 43 from the signal supply section SS, the image signal is supplied to the fourth source line 327δ via the third source electrode 45B and the third drain electrode 45C of the third switching TFT 45. When a switching signal is supplied to the second switching line 339 from the signal supply section SS, the fourth switching TFT 46 including the fourth gate electrode 46A that is connected to the second switching line 339 is driven. At this time, if an image signal is supplied to the distribution line 43 from the signal supply section SS, the image signal is supplied to the fifth source line 327ε via the fourth source electrode 46B and the fourth drain electrode 46C of the fourth switching TFT 46. When a switching signal is supplied to the third switching line 44 from the signal supply section SS, the fifth switching TFT 47 including the fifth gate electrode 47A that is connected to the third switching line 44 is driven. At this time, if an image signal is supplied to the distribution line 43 from the signal supply section SS, the image signal is supplied to the sixth source line 327ζ via the fifth source electrode 47B and the fifth drain electrode 47C of the fifth switching TFT 47. Thus, by controlling driving of the third switching TFT 45, the fourth switching TFT 46, and the fifth switching TFT 47, an image signal can be supplied to each of the fourth source line 327δ, the fifth source line 327ε, and the sixth source line 327ζ. It is difficult to keep a space for the lines in a portion of the non-display area NAA of the liquid crystal panel 311 adjacent to the first area AA1. In this respect, the first switching TFT 340 and the second switching TFT 341 are connected to the first source line 327α, the second source line 327β, and the third source line 327β that are disposed in the first area AA1. Therefore, the number of switching TFTs in the portion of the non-display area NAA adjacent to the first area AA1 can be reduced compared to the configuration in which the third switching TFT 45, the fourth switching TFT 46 and the fifth switching TFT 47 are connected to the fourth source line 327δ, the fifth source line 327ε, and the sixth source line 327ζ that are disposed in the second area AA2. With such a configuration, a space for arranging the lines can be provided in the portion of the non-display area NAA of the liquid crystal panel 311 that is adjacent to the first area AA1 and a frame width of the portion of the non-display area NAA can be reduced. Furthermore, the first switching line 338 is connected to the first gate electrode 340A of the first switching TFT 340 and the third gate electrode 45A of the third switching TFT 45 and the second switching line 339 is connected to the second gate electrode 341A of the second switching TFT 341 and the fourth gate electrode 46A of the fourth switching TFT 46. With such a configuration, the number of switching lines 44, 338, 339 can be reduced compared to a configuration in which switching lines are connected to the first gate electrode 340A and the third gate electrode 45A, respectively, and switching lines are connected to the second gate electrode 341A and the fourth gate electrode 46A, respectively. This is preferable to decrease a frame width of the portion of the non-display area NAA of the liquid crystal panel 311 adjacent to the first area AA1.

The first source line 327α, the second source line 327β, and the third source line 327γ are shorter than the fourth source line 327δ, the fifth source line 327ε, and the sixth source line 327ζ. Since the image signals supplied to the second source line 327β and the third source line 327γ are also supplied to the first source line 327α, signal delay is likely to be caused. In this respect, with the first source line 327α, the second source line 327β, and the third source line 327γ being shorter than the fourth source line 327δ, the fifth source line 327ε, and the sixth source line 327ζ, the resistance of the first source line 327α, the second source line 327β, and the third source line 327γ can be reduced and accordingly, signal delay is less likely to be caused on the image signal supplied to the second source line 327β and the third source line 327γ. On the other hand, the fourth source line 327δ, the fifth source line 327ε, and the sixth source line 327ζ are longer than the first source line 327α, the second source line 327β, and the third source line 327γ. The image signal supplied to the fourth source line 327δ is not supplied to the fifth source line 327ε and the sixth source line 327ζ. The image signal supplied to the fifth source line 327ε is not supplied to the fourth source line 327δ and the sixth source line 327ζ. The image signal supplied to the sixth source line 327ζ is not supplied to the fourth source line 327δ and the fifth source line 327ε. Therefore, signal delay is less likely to be caused on any of the image above signals.

Fifth Embodiment

A fifth embodiment will be described with reference to FIGS. 13 to 15. A display device 410 according to the fifth embodiment includes a liquid crystal panel 411 that includes a touch panel function in addition to the configuration of the first embodiment. Configuration, operations, and effects similar to those of the first embodiment may not be described.

The liquid crystal panel 411 according to this embodiment has a display function for displaying images and a touch panel function for detecting positions of input performed by a user based on the displayed images (input positions). The liquid crystal panel 411 includes an integrated touch panel pattern (with an in-cell technology) for exerting the touch panel function. The touch panel pattern uses so-called a projection type electrostatic capacitance method. A self-capacitance method is used for detection. As illustrated in FIG. 13, the touch panel pattern includes touch electrodes 48 (a position detection electrode) that are arranged in a matrix within the plate surface 411S of the liquid crystal panel 411. The touch electrodes 48 are disposed in the display area AA of the liquid crystal panel 411. The display area AA of the liquid crystal panel 411 substantially corresponds to a touch area in which input positions are detectable (a position input area). The non-display area NAA substantially corresponds to a non-touch area in which input positions are not detectable (a non-position input area). When the user intends to input a position based on a displayed image that is displayed in the display area AA of the liquid crystal panel 411 and the user moves a finger (a position input body) that is an electrically conductive member closer to the surface of the liquid crystal panel 411, the finger and the touch electrode 48 form a capacitor. A capacitance measured at the touch electrode 48 close to the finger changes as the finger approaches the touch electrode 48 and is different from a capacitance at the touch electrodes 48 farther from the finger. Based on the difference in capacitance, the input position can be detected. The touch electrode 48 has a substantially square plan view shape and one side dimension is about several millimeters. The plan view size of the touch electrode 48 is much larger than that of a pixel, which will be described later. The touch electrode 48 extends to overlap the pixels both in the X-axis direction and the Y-axis direction. The touch electrodes 48 are portions of a common electrode 428. The common electrode 428 includes dividing slits for separating the adjacent touch electrodes 48 from each other. The common electrode 428 is divided into the touch electrodes 48 with a grid pattern by the dividing slits and includes the touch electrodes 48 that are electrically independent from one another. The number and the plan view shape of the touch electrodes 48 may be altered as appropriate from those illustrated in FIG. 13.

Figure 13:
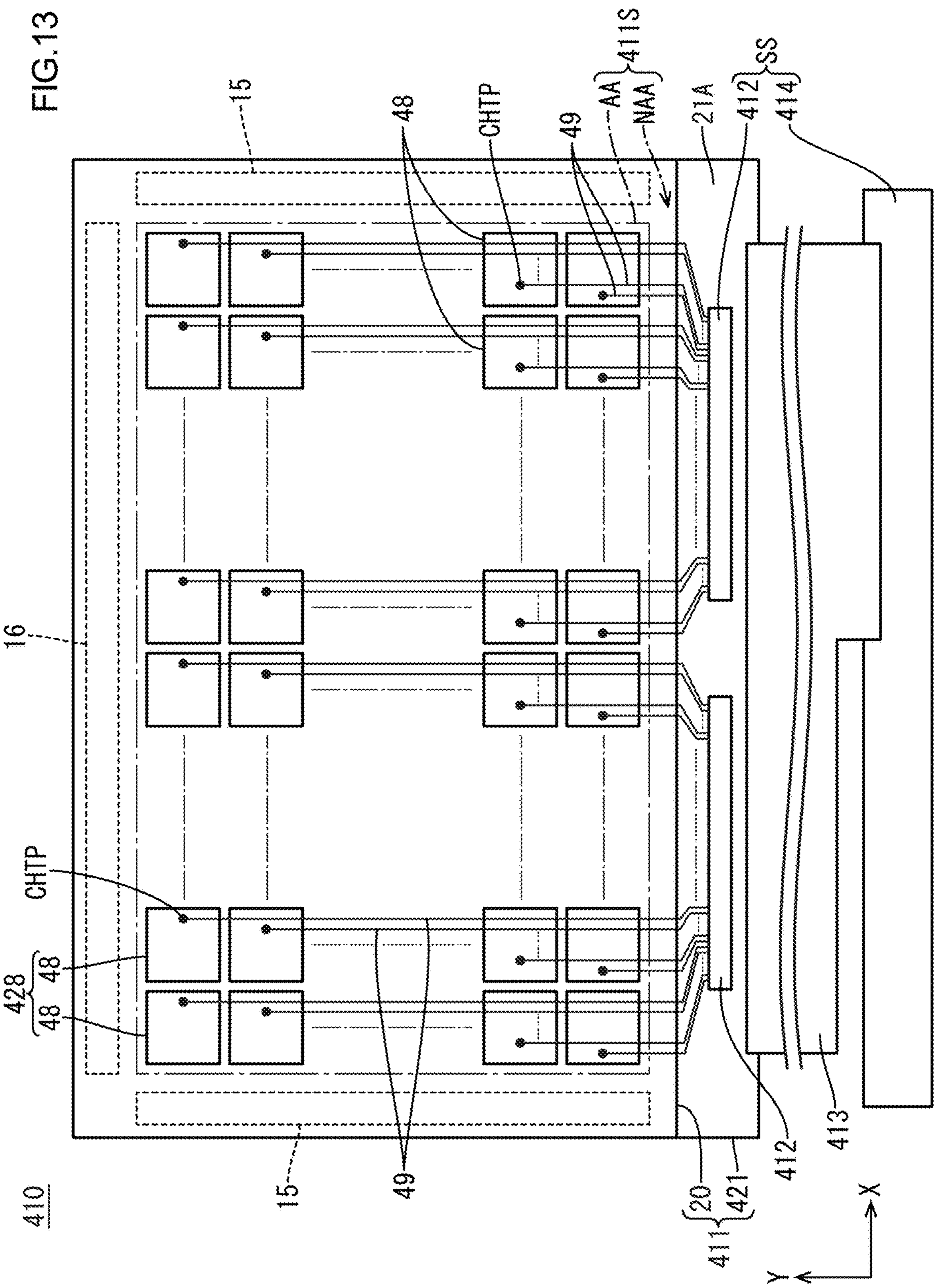
FIG. 13 is a plan view illustrating a liquid crystal panel, a driver, a flexible substrate, and a control board included according to a fifth embodiment.

As illustrated in FIG. 13, touch lines 49 (position detection lines) that are connected to the touch electrodes 48, respectively, are disposed on an inner surface side of an array substrate 421 in the display area AA. The touch lines 49 extend substantially along the Y-axis direction to cross the display area AA. The touch lines 49 extend parallel to source lines 427. The touch lines 49 are arranged at intervals with respect to the X-axis direction in the display area AA. At least one touch line 49 is connected to the touch electrode 48. The touch lines 49 are supplied with common potential signals for the image display function and touch signals (a position detection signal) for the touch function at different timings. A period while the touch lines 49 are supplied with the common potential signals is a display period and a period while the touch lines 49 are supplied with the touch signals is a sensing period (a position detection period). The common potential signals are transmitted to all the touch lines 49 for the display period and thus all the touch electrodes 48 are charged at the reference potential and function as the common electrode 428. The touch lines 49 are connected to a driver 412. The touch signals and the common potential signals are supplied to the touch lines 49 from the driver 412, which is the signal supply section SS. The touch lines 49 may be connected to a flexible substrate 413 and the touch signals and the common potential signals may be supplied to the touch lines 49 from a control board 414, which is the signal supply section SS. via the flexible substrate 413.

Figure 14:
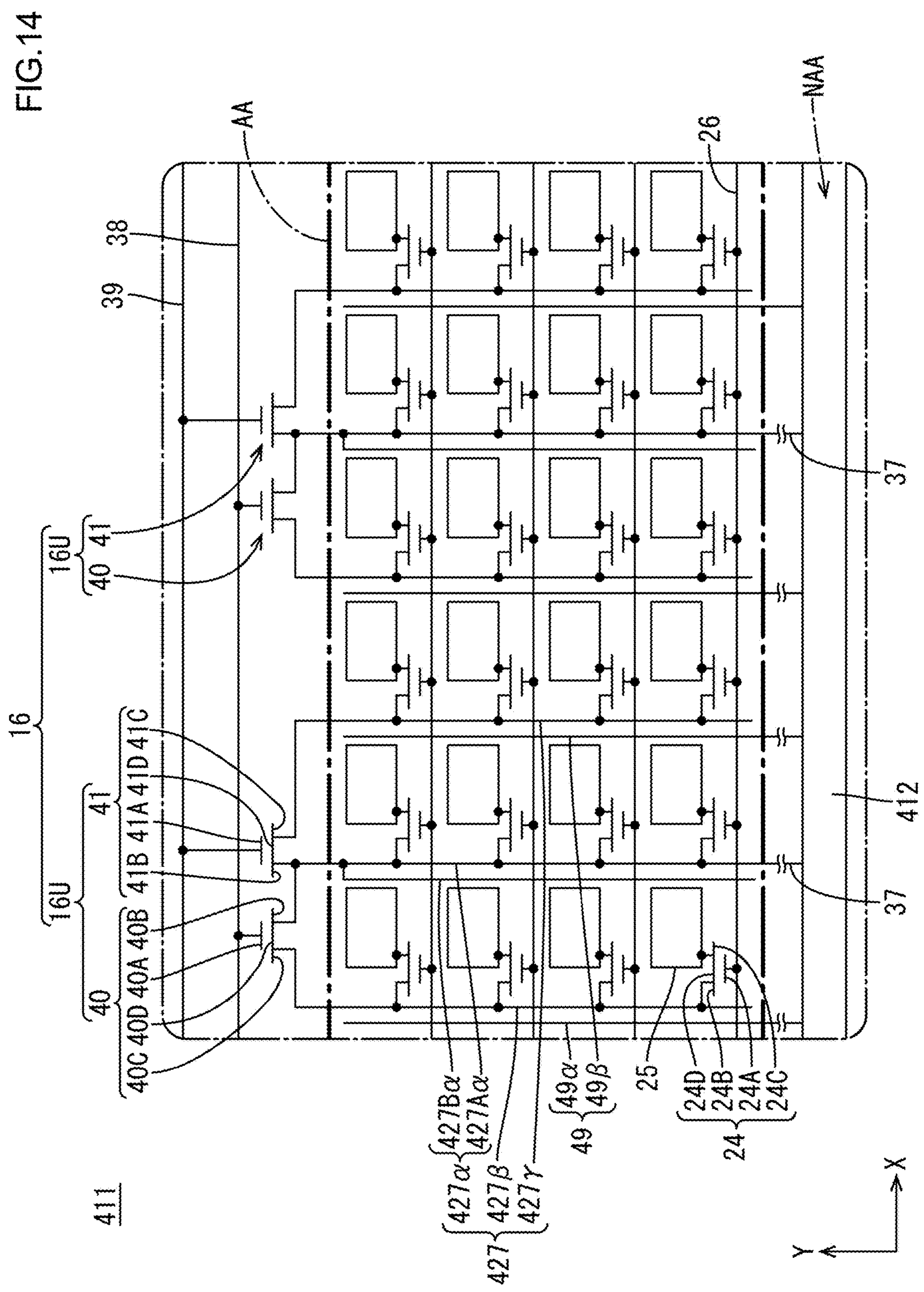
FIG. 14 is a circuit diagram illustrating an electrical configuration of the liquid crystal panel according to the fifth embodiment.
Figure 15:
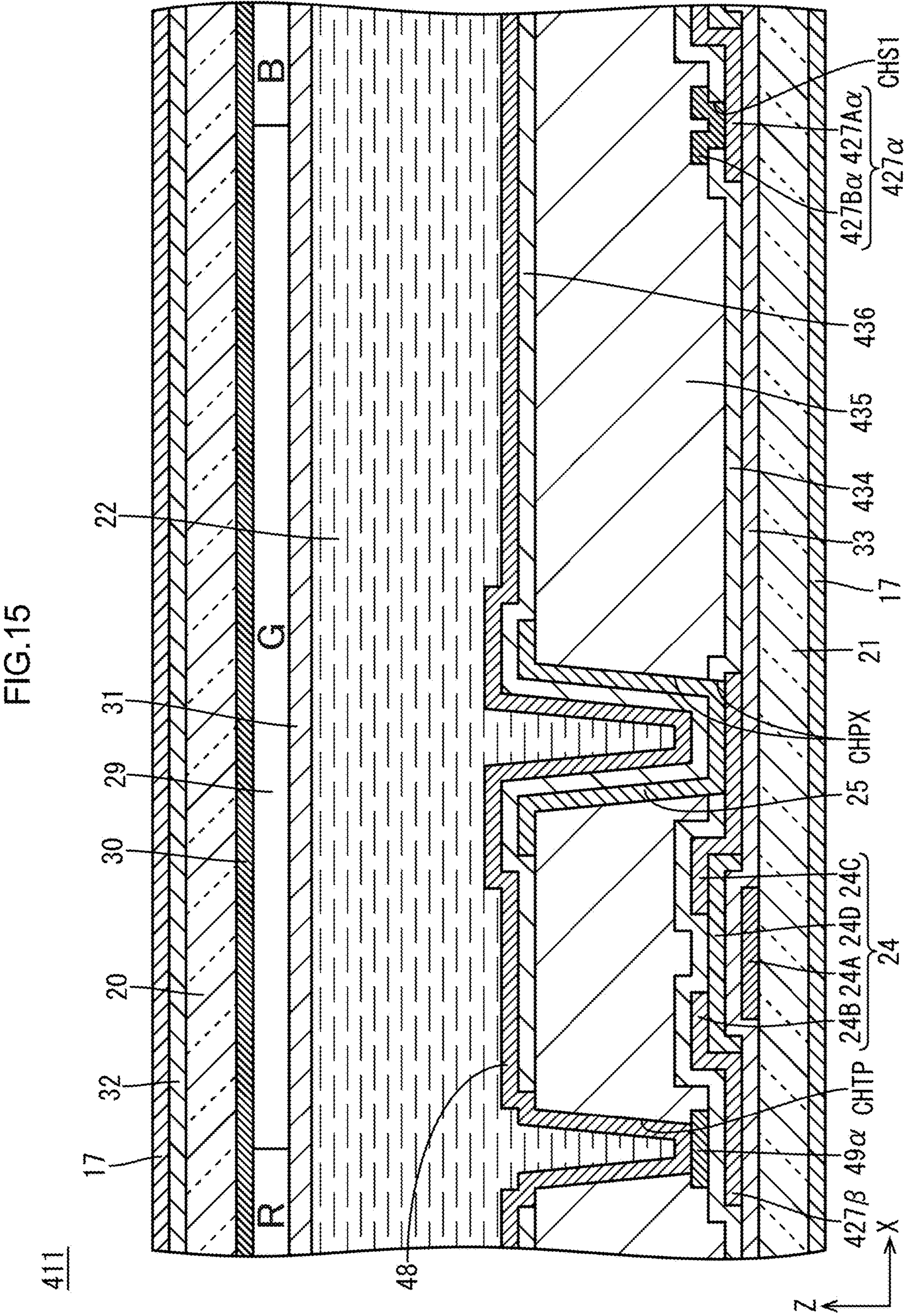
FIG. 15 is a cross-sectional view illustrating a portion of the liquid crystal panel according to the fifth embodiment along the same line as that of FIG. 5.

In this embodiment, as illustrated in FIGS. 14 and 15, the touch lines 49 overlap some of the source lines 427. Specifically, the touch lines 49 overlap second source lines 427β and third source lines 427γ of the source lines 427 and do not overlap first source lines 427α. Therefore, in this embodiment, the number of touch lines 49 is about two third of the number of source lines 427. The touch lines 49 include a first touch line 49α (a first position detection line) that overlaps the second source line 427β and a second touch line 49β (a second position detection line) that overlaps the third source line 427γ. In FIG. 14, the first touch line 49α and the second source line 427β that are overlapped with each other are illustrated with being arranged next to each other in the right-left direction and the second touch line 49β and the third source line 427γ that are overlapped with each other are illustrated with being arranged next to each other in the right-left direction. The first source line 427α includes a first line portion 427Aα and a second line portion 427Bα and the first line portion 427Aα and the second line portion 427Bα are illustrated next to each other in the right-left direction in FIG. 14.

As illustrated in FIG. 14, the first source line 427α has a configuration similar to that of the first source line 27α of the first embodiment. The first source line 427α has a layered structure in which the first line portion 427Aα and the second line portion 427Bα are connected. As illustrated in FIG. 15, each of the second source line 427β and the third source line 427γ is a portion of the second metal film and has a single layer structure. Each of the first touch line 49α and the second touch line 49β is a portion of the third metal film and has a single layer structure. The first touch line 49α, which is a portion of the third metal film, is disposed to overlap the second source line 427β, which is a portion of the second metal film, via a first interlayer insulating film 434. The second touch line 49, which is a portion of the third metal film, is disposed to overlap the third source line 427γ, which is a portion of the second metal film, via the first interlayer insulating film 434. The touch line 49 is connected to a target touch electrode 48 via a touch contact hole CHTP formed in a planarization film 435 and a second interlayer insulating film 436 that are between the touch line 49 and the target touch electrode 48. The plan view arrangement of the touch contact holes CHTP may be similar to the plan view arrangement of the contact holes CHS2, CHS3 of the first embodiment (refer to FIG. 3).

In this embodiment, as illustrated in FIG. 15, the first interlayer insulating film 434 is disposed between the first touch line 49α and the second source line 427β that are overlapped with each other and this prevents a short circuit. The first interlayer insulating film 434 is disposed between the second touch line 49β and the third source line 427γ that are overlapped with each other and this prevents a short circuit. With the first touch line 49α overlapping the second source line 427β and the second touch line 49β overlapping the third source line 427γ, an aperture ratio is less likely to be decreased due to the first touch line 49α and the second touch line 49β.

As previously described, this embodiment includes the first touch line 49α (a first position detection line) that is disposed in the display area AA and connected to the signal supply section SS, the second touch line 49β (a second position detection line) that is disposed in the display area AA and connected to the signal supply section SS, and the touch electrode 48 (a position detection electrode) that is disposed in the display area AA and connected to at least one of the first touch line 49α and the second touch line 49β. A capacitance is created between the touch electrode 48 and the position input body performing position input. The signal supply section SS is configured to supply touch signals (the position detection signal) to the first touch line 49α and the second touch line 49β. The second source line 427β is a portion of the second metal film that is different from a portion of the second metal configured as the first line portion 427Aα. The third source line 427γ is a portion of the second metal film that is different from the portions of the second metal configured as the first line portion 427Aα and the second source line 427β. The first touch line 49α is a portion of the third metal film that is different from a portion of the third metal film configured as the second line portion 427Bα. The first touch line 49α is disposed to overlap the second source line 427β. The second touch line 49β is a portion of the third metal film that is different from the portions of the third metal film configured as the second line portion 427Bα and the first touch line 49α. The second touch line 49β is disposed to overlap the third source line 427γ. A capacitance is created between the touch electrode 48 and the position input body performing position inputting and the input position performed by the position input body can be detected with using the touch signal that is supplied to the touch electrode 48 from the signal supply section SS via at least one of the first touch line 49α and the second touch line 49β. The first interlayer insulating film 434 is disposed between the first touch line 49α and the second source line 427β that are overlapped with each other and this prevents a short circuit. The first interlayer insulating film 434 is disposed between the second touch line 498 and the third source line 427γ that are overlapped with each other and this prevents a short circuit. With the first touch line 49α overlapping the second source line 427β and the second touch line 49β overlapping the third source line 427γ, an aperture ratio is less likely to be decreased due to the first touch line 49α and the second touch line 49β.

Sixth Embodiment

A sixth embodiment will be described with reference to FIGS. 16 and 17. The sixth embodiment includes common lines 51 for reducing a resistance distribution of a common electrode 528 in addition to the configuration of the first embodiment. Configuration, operations, and effects similar to those of the first embodiment may not be described.

Figure 16:
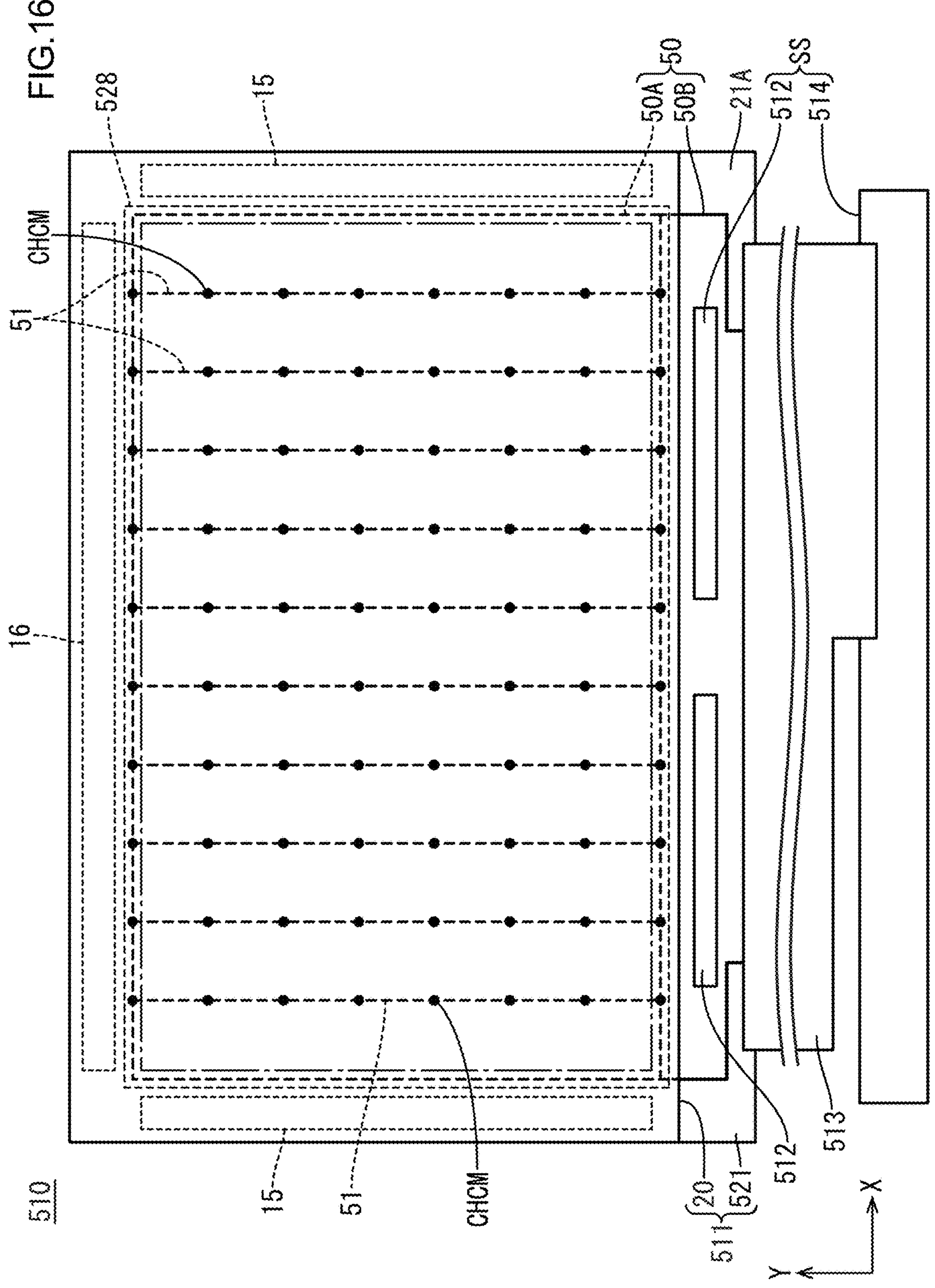
FIG. 16 is a plan view illustrating a liquid crystal panel, a driver, a flexible substrate, and a control board included according to a sixth embodiment.

As illustrated in FIG. 16, a display device 510 includes a liquid crystal panel 511. The liquid crystal panel 511 includes a common main line 50 that is connected to the common electrode 528 and a flexible substrate 513. The common main line 50 include a frame portion 50A and an extending portion 50B. The frame portion 50A has a frame shape surrounding an entire periphery of the display area AA. The extending portion 50B extends from the frame portion 50A to the flexible substrate 513. The frame portion 50A is disposed to overlap an outer edge portion of the common electrode 528 and connected to the common electrode 528. The common main line 50 is supplied with common potential signals from a control board 514, which is the signal supply section SS, via the flexible substrate 513.

As illustrated in FIG. 16, the common lines 51 that are connected to the common electrode 528 and the common main line 50 are disposed on an inner surface side of an array substrate 521 in the display area AA. The common lines 51 extend along the Y-axis direction to cross the display area AA and extend parallel to source lines 527. The common lines 51 are disposed at intervals with respect to the X-axis direction in the display area AA. Two ends of the common line 51 with respect to the Y-axis direction are connected to the frame portion 50A of the common main line 50. A middle portion of the common line 51 that is between the two ends is connected to the common electrode 528 at multiple connection portions. The common lines 51 are connected to the control board 514, which is the signal supply section SS, via the common main line 50 and the flexible substrate 513 and are supplied with common potential signals from the control board 514. The connection structure of the common lines 51 and the common electrode 528 is similar to the connection structure of the touch lines 49 and the touch electrodes 48 described in the fifth embodiment (refer to FIG. 15). Specifically, the common lines 51 are connected to the common electrode 528 via common contact holes CHCM formed in the planarization film 35 and the second interlayer insulating film 36 that are disposed between the common lines 51 and the common electrode 528.

Figure 17:
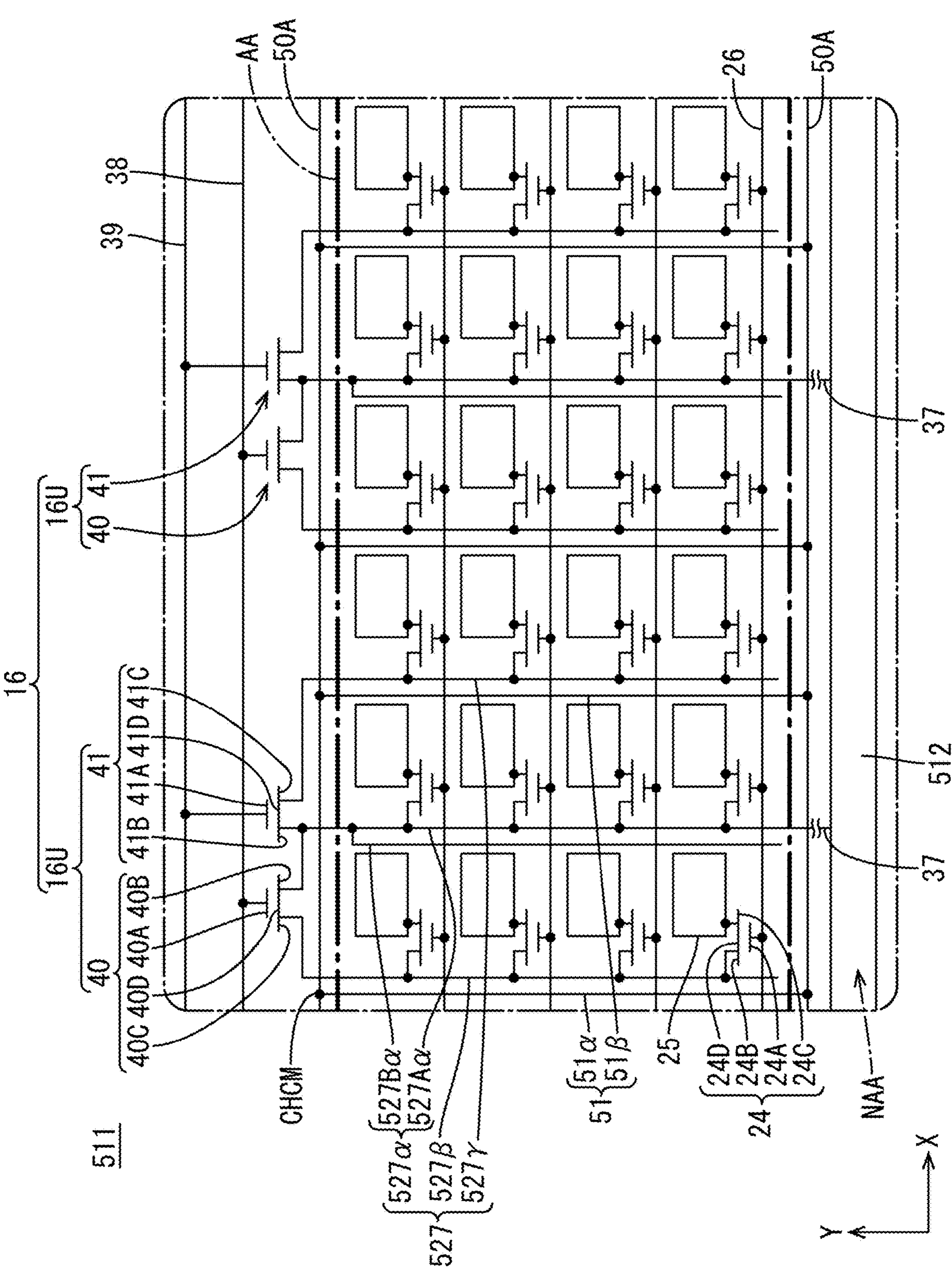
FIG. 17 is a circuit diagram illustrating an electrical configuration of the liquid crystal panel according to the sixth embodiment.

In this embodiment, as illustrated in FIG. 17, the common lines 51 overlap some of the source lines 527. Specifically, the common lines 51 overlap second source lines 5276 and third source lines 527γ of the source lines 527 and do not overlap first source lines 527α. Therefore, in this embodiment, the number of common lines 51 is about two third of the number of source lines 527. The common lines 51 include a first common line 51α that overlaps the second source line 527β and a second common line 51β that overlaps the third source line 527γ. In FIG. 17, the first common line 51α and the second source line 527β that are overlapped with each other are illustrated with being arranged next to each other in the right-left direction and the second common line 51β and the third source line 527γ that are overlapped with each other are illustrated with being arranged next to each other in the right-left direction. The first source line 527α includes a first line portion 527Aα and a second line portion 527Bα that are illustrated next to each other in the right-left direction in FIG. 17.

As illustrated in FIG. 17, the first source line 527α has a configuration similar to that of the first source line 27α of the first embodiment. The first source line 527α has a layered structure in which the first line portion 527Aα and the second line portion 527Bα are connected. Each of the second source line 527β and the third source line 527γ is a portion of the second metal film and has a single layer structure. Each of the first common line 51α and the second common line 51β is a portion of the third metal film and has a single layer structure. The first common line 51α, which is a portion of the third metal film, is disposed to overlap the second source line 527, which is a portion of the second metal film, via the first interlayer insulating film 34. The structure of the first common line 51α and the second source line 5276 is similar to that of the first touch line 49α and the second source line 427β described in the fifth embodiment (refer to FIG. 15). The second common line 51β, which is a portion of the third metal film, is disposed to overlap the third source line 527γ, which is a portion of the second metal film, via the first interlayer insulating film 34. The structure of the second common line 51β and the third source line 527γ is similar to that of the second touch line 498 and the third source line 427γ described in the fifth embodiment (refer to FIG. 15).

According to this embodiment, the common electrode 528 is supplied with common potential signals from the control board 514, which is the signal supply section SS, via the flexible substrate 513, the common main line 50, and the common lines 51. This is preferable to reduce a resistance distribution of the common electrode 528. The first interlayer insulating film 34 is disposed between the first common line 51α and the second source line 527β that are overlapped with each other and this prevents a short circuit. The first interlayer insulating film 34 is disposed between the second common line 51β and the third source line 527γ that are overlapped with each other and this prevents a short circuit. With the first common line 51α overlapping the second source line 527β and the second common line 51β overlapping the third source line 527γ, an aperture ratio is less likely to be decreased due to the first common line 51α and the second common line 51β.

As previously described, this embodiment includes the common electrode 528, the first common line 51α that is disposed in the display area AA and connected to the common electrode 528 and the signal supply section Ss, the second common line 51β that is disposed in the display area AA and connected to the common electrode 528 and the signal supply section SS. The signal supply section SS is configured to supply common potential signals to the first common line 51α and the second common line 51β. The second source line 527β is a portion of the second metal film that is different from a portion of the second metal configured as the first line portion 527Aα. The third source line 527γ is a portion of the second metal film that is different from the portions of the second metal configured as the first line portion 527Aα and the second source line 527β. The first common line 51α is a portion of the third metal film that is different from a portion of the third metal film configured as the second line portion 527Bα. The first common line 51α is disposed to overlap the second source line 527β. The second common line 51β is a portion of the third metal film that is different from the portions of the third metal film configured as the second line portion 527Bα and the first common line 51α. The second common line 51β is disposed to overlap the third source line 527γ. The common electrode 528 is supplied with common potential signals from the signal supply section SS via the first common line 51α and the second common line 51β. This is preferable to reduce a resistance distribution of the common electrode 528. The first interlayer insulating film 34 is disposed between the first common line 51α and the second source line 527β that are overlapped with each other and this prevents a short circuit. The first interlayer insulating film 34 is disposed between the second common line 51β and the third source line 527γ that are overlapped with each other and this prevents a short circuit. With the first common line 51α overlapping the second source line 527β and the second common line 51β overlapping the third source line 527γ, an aperture ratio is less likely to be decreased due to the first common line 51α and the second common line 51β.

Other Embodiments

The technology described herein is not limited to the embodiments described above and illustrated by the drawings. For example, the following embodiments will be included in the technical scope of the present technology.

(1) The switching line 38, 39, 44, 138, 238, 139, 239 may have a layered structure similar to that of the first source line 27α, 127α, 227α, 327α, 427α, 527α. The layered structure includes a lower layer portion, which is a portion of the second metal film, and an upper layer portion, which is a portion of the third metal film, and the lower layer portion and the upper layer portion are overlapped and connected. With such a configuration, the resistance of the switching line 38, 39, 44, 138, 238, 139, 239 can be reduced and signal delay is less likely to be caused on the switching signals.

(2) The switching line 38, 39, 44, 138, 238, 139, 239 may be connected to the driver 12, 112, 212, 312, 412, 512, which is the signal supply section SS. In such a configuration, the driver 12, 112, 212, 312, 412, 512 may be configured to supply image signals to the connection line 37, 137, 237, 337 (the source line 27, 127, 327, 427, 527) and supply switching signals to the switching line 38, 39, 44, 138, 238, 139, 239.

(3) In the configuration of each of the first to fourth embodiments, the source line 27α, 127α, 227α, 327α, 27β, 127β, 227β, 327β, 27γ, 127γ, 227γ, 327γ may be a portion of the second metal film and have a single layer structure.

(4) In the configuration of each of the fifth embodiment and the sixth embodiment, the first source line 427α, 527α may be a portion of the second metal film and have a single layer structure. In such a configuration, the touch line 49 and the common line 51, which are portions of the third metal, may be disposed to overlap the first source line 427α, 527α.

(5) In the configuration of each of the first to fourth embodiments, the source line contact hole CHS overlapping the lower layer portion 27A, which is a portion of the second metal film, and the upper layer portion 27B, which is a portion of the third metal film, may be formed in the non-display area NAA.

(6) In each of the configurations of the first, fifth, and sixth embodiment, the first switching circuit 16 may be disposed on the same side as the driver 12, 412, 512 with respect to the display area AA in the Y-axis direction.

(7) In the configuration of the second embodiment, the first switching circuit 116 connected to the source lines 127 that are disposed in the second area AA2 may be disposed on only one side (on the same side as the driver 112 or on the opposite side from the driver 112) with respect to the second area AA2 in the Y-axis direction.

(8) In the configuration of the third embodiment, the second unit switching circuit 216Uβ may be on the opposite side from the driver 212 with respect to the second area AA2 in the Y-axis direction. The second unit switching circuit 216Uβ may be disposed on both sides of the second area AA2 in the Y-axis direction.

(9) In the configuration of the fourth embodiment, the first switching circuit 316 may be disposed on the opposite side from the driver 312 with respect to the first area AA1 in the Y-axis direction. The second switching circuit 42 may be disposed on the opposite side from the driver 312 with respect to the second area AA2 in the Y-axis direction.

(10) In the configuration of the fourth embodiment, the first switching circuit 316 may be disposed on both sides of the first area AA1 in the Y-axis direction. The second switching circuit 42 may be disposed on both sides of the second area AA2 in the Y-axis direction.

(11) In the configuration of the sixth embodiment, the common main line 50 may be connected to the driver 512.

(12) In the configuration of the sixth embodiment, the common lines 51 may not be connected to the common main line 50 but connected to the flexible substrate 513. The common lines 51 may not be connected to the common main line 50 but connected to the driver 512.

(13) The common main line 50 of the sixth embodiment may be included in the configuration of the first to fifth embodiments as appropriate.

(14) The configuration of the second to fourth embodiment may be combined with the configuration of the fifth embodiment and the sixth embodiment.

(15) In the array substrate 21, 121, 421, 521, the third metal film may be included in a layer upper than the planarization film 35, 436. In such a configuration, an interlayer insulating film may be additionally included between the third metal film and the first transparent electrode film. Furthermore, in such a configuration, the first interlayer insulating film 34, 434 may not be included.

(16) The number and the arrangement of the driver 12, 112, 212, 312, 412, 512 may be altered from those illustrated in the drawings as appropriate.

(17) Material of the semiconductor film included in the array substrate 21, 121, 421, 521 may be any of amorphous silicon material, oxide semiconductor material, and polycrystalline silicon material. With polycrystalline silicon material being used for the semiconductor film, the semiconductor film may be included in a layer lower than the first metal film.

(18) The TFT 24, 324, 40, 140, 240, 340, 41, 141, 241, 341, 45, 46, 47 may be a bottom gate TFT, a top gate TFT, or a double gate TFT.

(19) A gate driver may be mounted on the array substrate 21, 121, 421, 521 instead of the gate driver circuit 15, 115.

(20) The driver 12, 112, 212, 312, 412, 512 may be mounted on the flexible substrate 13, 313, 413, 513 through the chip-on-film (COF) technology. The flexible substrate 13, 313, 413, 513 is mounted on the array substrate 21, 121, 421, 521 through the film-on-glass (FOG) technology.

(21) The planar shape of the liquid crystal panel 11, 111, 211, 311, 411, 511 may be vertically elongated rectangle, a square, a circle, a semicircle, a vertically elongated oval, an oval, or a trapezoid.

(22) The liquid crystal panel 11, 111, 211, 311, 411, 511 may be a reflective liquid crystal panel or a semitransmissive liquid crystal panel other than the transmissive liquid crystal panel.

(23) The display mode of the liquid crystal panel 11, 111, 211, 311, 411, 511 may be the MVA (multi-domain vertical alignment) mode, the IPS (in-plane switching) mode, and the TN (twisted nematic) mode.

(24) Display panels other than the liquid crystal panel 11, 111, 211, 311, 411, 511 such as organic electro luminescence (EL) display panels and microcapsule-based electrophoretic display (EPD) panels may be used.

The invention claimed is:

1. A display device comprising:

a display panel including a display area in which an image is displayed, and a non-display area in which no image is displayed;

a first line disposed in the display area;

a second line disposed in the display area;

a third line disposed in the display area, wherein the first line is disposed between the second line and the third line, and the first line, the second line, and the third line extend along a first direction;

a connection line disposed in the non-display area and connected to the first line;

a first switching line disposed in the non-display area;

a first switching component disposed in the non-display area and including a first gate electrode that is connected to the first switching line, a first source electrode that is connected to the first line, and a first drain electrode that is connected to the second line;

a second switching line disposed in the non-display area;

a second switching component disposed in the non-display area and including a second gate electrode that is connected to the second switching line, a second source electrode that is connected the first line, and a second drain electrode that is connected to the third line; and a signal supply section disposed in the non-display area and connected to the connection line, the first switching line, and the second switching line, the signal supply section including at least a first signal supply section that is disposed on the display panel, connected to the connection line, and configured to supply the image signal to the connection line, the signal supply section being configured to supply a switching signal, having a voltage higher than a threshold voltage of the first switching component and the second switching component, to the first switching line and the second switching line at different timings, wherein:

the first line, the second line, the third line, the connection line, the first switching line, the second switching line, the first switching component, and the second switching component are disposed on the display panel, and the first signal supply section and each of the first switching component and the second switching component are disposed on the display panel so as to sandwich the display area with respect to the first direction.

2. The display device according to claim 1, wherein the first switching component and the second switching component are further disposed between the display area and the first switching line.

3. The display device according to claim 1, wherein the first switching component and the second switching component are further disposed so as to sandwich the first line with respect to a second direction that crosses the first direction.

4. The display device according to claim 1, wherein:

the first line includes a first line portion that is a portion of a first conductive film, and a second line portion that is a portion of a second conductive film, the second conductive film is disposed in an upper layer relative to the first conductive film via a first insulating film, and the first line portion and the second line portion overlap and are connected via a first contact hole formed in the first insulating film.

5. The display device according to claim 4, wherein:

the second line includes a third line portion and a fourth line portion, the third line portion is a portion of the first conductive film that is different from the portion of the first conductive film configured as the first line portion, the fourth line portion is a portion of the second conductive film that is different from the portion of the second conductive film configured as the second line portion, the third line includes a fifth line portion and a sixth line portion, the fifth line portion is a portion of the first conductive film that is different from the portions of the first conductive film configured as the first line portion and the third line portion, the sixth line portion is a portion of the second conductive film that is different from the portions of the second conductive film configured as the second line portion and the fourth line portion, the third line portion and the fourth line portion overlap and are connected via a second contact hole formed in the first insulating film, and the fifth line portion and the sixth line portion overlap and are connected via a third contact hole formed in the first insulating film.

6. The display device according to claim 4, further comprising:

a first position detection line disposed in the display area and connected to the signal supply section;

a second position detection line disposed in the display area and connected to the signal supply section; and position detection electrodes that are disposed in the display area and create a capacitance with a position input body performing position inputting, each of the position detection electrodes being connected to at least one of the first position detection line and the second position detection line, wherein:

the signal supply section is configured to supply a position detection signal to the first position detection line and the second position detection line, the second line is a portion of the first conductive film that is different from the portion of the first conductive film configured as the first line portion, the third line is a portion of the first conductive film that is different from the portions of the first conductive film configured as the first line portion and the second line, the first position detection line is a portion of the second conductive film that is different from the portion of the second conductive film configured as the second line portion, and the first position detection line is disposed to overlap the second line, and the second position detection line is a portion of the second conductive film that is different from the portions of the second conductive film configured as the second line portion and the first position detection line, and the second position detection line is disposed to overlap the third line.

7. The display device according to claim 4, further comprising:

a common electrode disposed in the display area;

a first common line disposed in the display area, and connected to the common electrode and the signal supply section; and a second common line disposed in the display area, and connected to the common electrode and the signal supply section, wherein:

the signal supply section is configured to supply a common potential signal to the first common line and the second common line, the second line is a portion of the first conductive film that is different from the portion of the first conductive film configured as the first line portion, the third line is a portion of the first conductive film that is different from the portions of the first conductive film configured as the first line portion and the second line, the first common line is a portion of the second conductive film that is different from the portion of the second conductive film configured as the second line portion, and the first common line is disposed to overlap the second line, and the second common line is a portion of the second conductive film that is different from the portions of the second conductive film configured as the second line portion and the first common line, and the second common line is disposed to overlap the third line.

8. The display device according to claim 1, further comprising:

a flexible substrate connected to the display panel, wherein:

the signal supply section further includes a second signal supply section connected to the flexible substrate, the first signal supply section is configured to supply the image signal to the connection line, and the second signal supply section is configured to supply the switching signal to the first switching line and the second switching line at different timings, via the flexible substrate.

9. A display device comprising:

a display panel including a display area in which an image is displayed, and a non-display area in which no image is displayed;

a first line disposed in the display area;

a second line disposed in the display area;

a third line disposed in the display area, wherein the first line is disposed between the second line and the third line, and the first line, the second line, and the third line extend along a first direction;

a connection line disposed in the non-display area and connected to the first line;

a first switching line disposed in the non-display area;

a first switching component disposed in the non-display area and including a first gate electrode that is connected to the first switching line, a first source electrode that is connected to one of the first line or the connection line, and a first drain electrode that is connected to the second line;

a second switching line disposed in the non-display area;

a second switching component disposed in the non-display area and including a second gate electrode that is connected to the second switching line, a second source electrode that is connected to one of the first line or the connection line, and a second drain electrode that is connected to the third line; and a signal supply section disposed in the non-display area and connected to the connection line, the first switching line, and the second switching line, the signal supply section including at least a first signal supply section that is disposed on the display panel, connected to the connection line, and configured to supply the image signal to the connection line, the signal supply section being configured to supply a switching signal, having a voltage higher than a threshold voltage of the first switching component and the second switching component, to the first switching line and the second switching line at different timings, wherein:

the first line, the second line, the third line, the connection line, the first switching line, the second switching line, the first switching component, and the second switching component are disposed on the display panel, the first switching component includes first constituent switching components, and the second switching component includes second constituent switching components, a first switching component of the first constituent switching components, defined as a one-side first switching component, and a second switching component of the second constituent switching components, defined as a one-side second switching component, are defined as a first pair of first and second switching components, and a second one of the first constituent switching components, defined as another-side first switching component, and a second one of the second constituent switching components, defined as another-side second switching component, are defined as a second pair of first and second switching components, the first pair of first and second switching components and the second pair of first and second switching components are disposed on the display panel so as to sandwich the display area with respect to the first direction, the first signal supply section is disposed on a same side as the first pair of first and second switching components on the display panel, the first source electrode of the one-side first switching component is defined as a one-side first source electrode, and the second source electrode of the one-side second switching component is defined as a one-side second source electrode, the connection line is connected to the one-side first source electrode and the one-side second source electrode, the second pair of first and second switching components is disposed on an opposite side from the first signal supply section with respect to the display area, in the first direction, the first source electrode of the other-side first switching component is defined as an other-side first source electrode, and the second source electrode of the other-side second switching component is defined as an other-side second source electrode, and the first line is connected to the other-side first source electrode and the other-side second source electrode.

10. The display device according to claim 9, wherein:

the first line includes a first line portion that is a portion of a first conductive film and a second line portion that is a portion of a second conductive film, the second conductive film is disposed in an upper layer relative to the first conductive film via a first insulating film, and the first line portion and the second line portion overlap and are connected via a first contact hole formed in the first insulating film.

11. The display device according to claim 10, wherein:

the second line includes a third line portion and a fourth line portion, the third line portion is a portion of the first conductive film that is different from the portion of the first conductive film configured as the first line portion, the fourth line portion is a portion of the second conductive film that is different from the portion of the second conductive film configured as the second line portion, the third line includes a fifth line portion and a sixth line portion, the fifth line portion is a portion of the first conductive film that is different from the portions of the first conductive film configured as the first line portion and the third line portion, the sixth line portion is a portion of the second conductive film that is different from the portions of the second conductive film configured as the second line portion and the fourth line portion, the third line portion and the fourth line portion overlap and are connected via a second contact hole formed in the first insulating film, and the fifth line portion and the sixth line portion overlap and are connected via a third contact hole formed in the first insulating film.

12. The display device according to claim 10, further comprising:

a first position detection line disposed in the display area and connected to the signal supply section;

a second position detection line disposed in the display area and connected to the signal supply section; and position detection electrodes that are disposed in the display area and create a capacitance with a position input body performing position inputting, each of the position detection electrodes being connected to at least one of the first position detection line and the second position detection line, wherein:

the signal supply section is configured to supply a position detection signal to the first position detection line and the second position detection line, the second line is a portion of the first conductive film that is different from the portion of the first conductive film configured as the first line portion, the third line is a portion of the first conductive film that is different from the portions of the first conductive film configured as the first line portion and the second line, the first position detection line is a portion of the second conductive film that is different from the portion of the second conductive film configured as the second line portion and the first position detection line is disposed to overlap the second line, and the second position detection line is a portion of the second conductive film that is different from the portions of the second conductive film configured as the second line portion and the first position detection line and the second position detection line is disposed to overlap the third line.

13. The display device according to claim 10, further comprising:

a common electrode disposed in the display area;

a first common line disposed in the display area, and connected to the common electrode and the signal supply section; and a second common line disposed in the display area, and connected to the common electrode and the signal supply section, wherein:

the signal supply section is configured to supply a common potential signal to the first common line and the second common line, the second line is a portion of the first conductive film that is different from the portion of the first conductive film configured as the first line portion, the third line is a portion of the first conductive film that is different from the portions of the first conductive film configured as the first line portion and the second line, the first common line is a portion of the second conductive film that is different from the portion of the second conductive film configured as the second line portion and the first common line is disposed to overlap the second line, and the second common line is a portion of the second conductive film that is different from the portions of the second conductive film configured as the second line portion and the first common line and the second common line is disposed to overlap the third line.

14. The display device according to claim 9, further comprising a flexible substrate connected to the display panel, wherein:

the signal supply section further includes a second signal supply section connected to the flexible substrate, the first signal supply section is configured to supply the image signal to the connection line, and the second signal supply section is configured to supply the switching signal to the first switching line and the second switching line at different timings, via the flexible substrate.

15. A display device comprising:

a display panel including a display area in which an image is displayed, and a non-display area in which no image is displayed;

a first line disposed in the display area;

a second line disposed in the display area;

a third line disposed in the display area, wherein the first line is disposed between the second line and the third line;

a connection line disposed in the non-display area and connected to the first line;

a first switching line disposed in the non-display area;

a first switching component disposed in the non-display area and including a first gate electrode that is connected to the first switching line, a first source electrode that is connected to one of the first line or the connection line, and a first drain electrode that is connected to the second line;

a second switching line disposed in the non-display area;

a second switching component disposed in the non-display area and including a second gate electrode that is connected to the second switching line, a second source electrode that is connected to one of the first line or the connection line, and a second drain electrode that is connected to the third line; and a signal supply section disposed in the non-display area and connected to the connection line, the first switching line, and the second switching line, the signal supply section being configured to supply an image signal to the connection line and to supply a switching signal, having a voltage higher than a threshold voltage of the first switching component and the second switching component, to the first switching line and the second switching line at different timings, wherein:

the signal supply section is configured to initially supply the switching signal to the first switching line with supplying the image signal to the connection line, and to supply the switching signal to the second switching line with supplying the image signal to the connection line, and thereafter, to supply the image signal to the connection line without supplying the switching signal to the first switching line and the second switching line.

16. The display device according to claim 15, wherein:

the first line includes a first line portion that is a portion of a first conductive film and a second line portion that is a portion of a second conductive film, the second conductive film is disposed in an upper layer relative to the first conductive film via a first insulating film, and the first line portion and the second line portion overlap and are connected via a first contact hole formed in the first insulating film.

17. The display device according to claim 16, wherein:

the second line includes a third line portion and a fourth line portion, the third line portion is a portion of the first conductive film that is different from the portion of the first conductive film configured as the first line portion, the fourth line portion is a portion of the second conductive film that is different from the portion of the second conductive film configured as the second line portion, the third line includes a fifth line portion and a sixth line portion, the fifth line portion is a portion of the first conductive film that is different from the portions of the first conductive film configured as the first line portion and the third line portion, the sixth line portion is a portion of the second conductive film that is different from the portions of the second conductive film configured as the second line portion and the fourth line portion, the third line portion and the fourth line portion overlap and are connected via a second contact hole formed in the first insulating film, and the fifth line portion and the sixth line portion overlap and are connected via a third contact hole formed in the first insulating film.

18. The display device according to claim 16, further comprising:

a first position detection line disposed in the display area and connected to the signal supply section;

a second position detection line disposed in the display area and connected to the signal supply section; and position detection electrodes that are disposed in the display area and create a capacitance with a position input body performing position inputting, each of the position detection electrodes being connected to at least one of the first position detection line and the second position detection line, wherein:

the signal supply section is configured to supply a position detection signal to the first position detection line and the second position detection line, the second line is a portion of the first conductive film that is different from the portion of the first conductive film configured as the first line portion, the third line is a portion of the first conductive film that is different from the portions of the first conductive film configured as the first line portion and the second line, the first position detection line is a portion of the second conductive film that is different from the portion of the second conductive film configured as the second line portion and the first position detection line is disposed to overlap the second line, and the second position detection line is a portion of the second conductive film that is different from the portions of the second conductive film configured as the second line portion and the first position detection line and the second position detection line is disposed to overlap the third line.

19. The display device according to claim 16, further comprising:

a common electrode disposed in the display area;

a first common line disposed in the display area, and connected to the common electrode and the signal supply section; and a second common line disposed in the display area, and connected to the common electrode and the signal supply section, wherein:

the signal supply section is configured to supply a common potential signal to the first common line and the second common line, the second line is a portion of the first conductive film that is different from the portion of the first conductive film configured as the first line portion, the third line is a portion of the first conductive film that is different from the portions of the first conductive film configured as the first line portion and the second line, the first common line is a portion of the second conductive film that is different from the portion of the second conductive film configured as the second line portion and the first common line is disposed to overlap the second line, and the second common line is a portion of the second conductive film that is different from the portions of the second conductive film configured as the second line portion and the first common line and the second common line is disposed to overlap the third line.

20. The display device according to claim 15, further comprising a flexible substrate connected to the display panel, wherein:

the first line, the second line, the third line, the connection line, the first switching line, the second switching line, the first switching component, and the second switching component are disposed on the display panel, the signal supply section includes a first signal supply section disposed on the display panel, and a second signal supply section connected to the flexible substrate, the first signal supply section is configured to supply the image signal to the connection line, and the second signal supply section is configured to supply the switching signal to the first switching line and the second switching line at different timings, via the flexible substrate.

* * * * *